(12) United States Patent
Mizoguchi

(10) Patent No.: US 9,492,977 B2
(45) Date of Patent: Nov. 15, 2016

(54) METHOD FOR PRODUCING RESIN FILM, CASTING DIE, DEVICE FOR PRODUCING RESIN FILM, RESIN FILM, POLARIZING PLATE, AND LIQUID CRYSTAL DISPLAY DEVICE

(75) Inventor: Keisuke Mizoguchi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 748 days.

(21) Appl. No.: 13/881,079

(22) PCT Filed: Sep. 8, 2011

(86) PCT No.: PCT/JP2011/005048
§ 371 (c)(1),
(2), (4) Date: Apr. 23, 2013

(87) PCT Pub. No.: WO2012/056625
PCT Pub. Date: May 3, 2012

(65) Prior Publication Data
US 2013/0207300 A1  Aug. 15, 2013

(30) Foreign Application Priority Data

Oct. 26, 2010  (JP) .................................. 2010-239800

(51) Int. Cl.
*B29C 41/28*  (2006.01)
*B29D 7/01*  (2006.01)
(Continued)

(52) U.S. Cl.
CPC ................. *B29D 7/01* (2013.01); *B29C 41/28* (2013.01); *G02B 5/3083* (2013.01); *B29K 2001/00* (2013.01)

(58) Field of Classification Search
CPC .................................. B29C 41/24; B29C 41/28
(Continued)

(56) References Cited

U.S. PATENT DOCUMENTS

2007/0128381 A1* 6/2007 Yajima ................ B29C 47/0021
428/1.31
2009/0026652 A1  1/2009 Shimokochi et al.

FOREIGN PATENT DOCUMENTS

JP  2006-289888 A  10/2006
JP  2008-194956 A  8/2008
(Continued)

OTHER PUBLICATIONS

International Search Report of PCT/JP2011/005048 dated Oct. 11, 2011.

*Primary Examiner* — Christina Johnson
*Assistant Examiner* — Xue Liu
(74) *Attorney, Agent, or Firm* — Lucas & Mercanti, LLP

(57) ABSTRACT

An aspect of the present invention is a method for producing a resin film, wherein in a casting step of a solution cast film-forming method, a dope is discharged from a discharge port of the casting die to cast the dope onto the support while a solvent capable of dissolving a transparent resin is flowed from the positions above the discharge port of the casting die through the outer surface of the casting die, and further from the longitudinally opposite ends of the discharge port of the casting die. The casting die has a surface energy of a first region which is 10 mN/m to 30 mN/m higher than a surface energy of a second region, the first region being the region, on the outer surface of the casting die, surrounded by the positions above the longitudinally opposite ends of the discharge port of the casting die and the longitudinally opposite ends of the discharge port of the casting die, and the second region being a region which is closer to a longitudinally central portion of the discharge port of the casting die than the first region.

5 Claims, 9 Drawing Sheets

(51) Int. Cl.
  *G02B 5/30*     (2006.01)
  *B29K 1/00*     (2006.01)
(58) Field of Classification Search
  USPC .................................................. 264/216, 212
  See application file for complete search history.

(56) References Cited

FOREIGN PATENT DOCUMENTS

| | | |
|---|---|---|
| JP | 2009-045928 A | 3/2009 |
| JP | 2010-179475 A | 8/2010 |

\* cited by examiner

US 9,492,977 B2

METHOD FOR PRODUCING RESIN FILM, CASTING DIE, DEVICE FOR PRODUCING RESIN FILM, RESIN FILM, POLARIZING PLATE, AND LIQUID CRYSTAL DISPLAY DEVICE

CROSS REFERENCE TO RELATED APPLICATION

This Application is a 371 of PCT/JP2011/005048 filed on Sep. 8, 2011, which claimed the priority of Japanese Patent Application No. 2010-239800 filed on Oct. 26, 2010, both applications are incorporated herein by reference in its entirety.

TECHNICAL FIELD

The present invention relates to a method for producing a resin film, a casting die for use in the producing method, a device for producing a resin film which device includes the casting die, a resin film obtained by the producing method, a polarizing plate including the resin film used as a transparent protective film, and a liquid crystal display device including the polarizing plate.

BACKGROUND ART

Resin films are used in various fields, for example, for liquid crystal display devices, in view of their chemical characteristics, mechanical characteristics, electrical characteristics, and the like. Specifically, various resin films, for example, transparent protective films for protecting polarizing elements on a polarizing plate are arranged in an image display area of a liquid crystal display device. As such resin films, for example, cellulose ester films which are excellent in transparency are widely used.

A resin film such as a cellulose ester film can be produced using a resin solution (dope) in which a material resin such as a cellulose ester resin is dissolved into a solvent. Specifically, a method for producing a resin film using such dope includes, for example, a solution cast film-forming method. The solution cast film-forming method is used for producing an elongate resin film by casting dope on a running support to form a cast membrane, drying the cast membrane to the degree that the cast membrane can be released, releasing the cast membrane from the support to obtain a film, and conveying the released film by a conveying roller, while performing a drying operation, a stretching operation, and the like on the film.

When a resin film is produced by the solution cast film-forming method as above, membranes derived from a dope, i.e. so-called membrane burrs, may be formed at the outer surface around a discharge port of a casting die, specifically at the outer surface around the central portion of the discharge port of the casting die or at the outer surface around both ends of the discharge port of the casting die. Such membranes may gradually grow with the progress of production of resin films. There has been a problem such that such membranes may disturb the flow of the casting dope to block the production of resin films. There has also been a problem such that the membranes detached from the casting die may damage the formed resin film.

A method may be mentioned that uses a casting die having a dope-contacting surface which has been subjected to a surface treatment in order to suppress the formation of the membrane, particularly the formation of the membranes at the outer surface around the central portion of the discharge port of the casting die during production of resin films by the solution cast film-forming method. Specifically, the methods described in Patent Documents 1 and 2 may be mentioned.

Patent Document 1 discloses a method for producing a propylene film by extruding a propylene resin through a T-die in which the T-die used has a ceramic thermal spray coated part formed by thermal spray coating of a ceramic material at the edge of a lip opening.

Patent Document 1 discloses that the propylene film obtained does not contain or is not contaminated with a foreign material attached at a lip part surrounding the lip opening of the die.

Patent Document 2 discloses a method for producing a cellulose resin film by melt film formation comprising discharging, as a sheet shape, a molten resin melted in an extruder from a die onto a running or rotating cooling support to cool and solidify the same, wherein a contacting part of the die which is brought into contact with the molten resin has a surface roughness of 0.3 µm or less, a contact angle of 50° or more and a surface energy of 60 mN/m or less.

Patent Document 2 discloses that generation of streak troubles which cause deterioration of surface quality of the film upon discharge of the molten resin from the die can be prevented and the cellulose resin films having excellent optical properties can be efficiently produced.

In order to suppress the formation of the membranes, particularly the formation of the membranes at the outer surface around both ends of the discharge port of the casting die, a method may be mentioned in which, when a dope is discharged from the casting die so as to cast the dope onto a running support to form a cast membrane, a solvent capable of dissolving a transparent resin contained in the dope is allowed to fall from longitudinally opposite ends of the discharge port of the casting die at the same time as discharge of the dope. Specifically, the method described in Patent Document 3 may be mentioned.

Patent Document 3 discloses a solution film formation method comprising discharging a dope containing a polymer and a solvent from a discharge part of a casting die onto a support running endlessly to form a casting bead between the discharge part of the casting die and the support and to form a cast membrane on the support, releasing the cast membrane from the support as a wet film and drying the released wet film to obtain a film, wherein an anticoagulant liquid is discharged from a liquid supplying nozzle having a nozzle port above the discharge part towards the vicinity of the end of the discharge part, the anticoagulant liquid discharged from the liquid supplying nozzle is guided by means of a guide path to the vicinity of the end of the discharge part, a liquid pool of the anticoagulant liquid is formed in the vicinity of the end of the discharge part, thereby supplying the anticoagulant liquid to the end of the discharging part and to an end along the width direction of the casting bead.

Patent Document 3 discloses that the anticoagulant liquid can be stably and accurately supplied to both ends of the casting bead.

Patent Document 1: Japanese Patent Application Laid-open No. 2006-289888
Patent Document 2: Japanese Patent Application Laid-open No. 2008-194956
Patent Document 3: Japanese Patent Application Laid-open No. 2009-45928

SUMMARY OF THE INVENTION

An object of the present invention is to provide a method for producing a resin film which can prevent the formation of membranes derived from a resin solution used for production of the resin film. Another object of the present invention is to provide a casting die for use in the producing method, a device for producing a resin film which device includes the casting die, a resin film obtained by the producing method, a polarizing plate including the resin film used as a transparent protective film, and a liquid crystal display device including the polarizing plate.

An aspect of the present invention is a method for producing a resin film, including a casting step of casting a resin solution containing a transparent resin from a casting die onto a running support to form a cast membrane; and a releasing step of releasing the cast membrane from the support, wherein, in the casting step, the resin solution is discharged from a discharge port of the casting die to cast the resin solution onto the support while a solvent capable of dissolving the transparent resin is flowed on an outer surface of the casting die from the positions above longitudinally opposite ends of the discharge port of the casting die toward the longitudinally opposite ends of the discharge port of the casting die, so that the solvent falls from the longitudinally opposite ends of the discharge port of the casting die; and the casting die has a surface energy of a first region which is 10 mN/m to 30 mN/m higher than a surface energy of a second region, the first region being the region, on the outer surface of the casting die, surrounded by the positions above the longitudinally opposite ends of the discharge port of the casting die and the longitudinally opposite ends of the discharge port of the casting die, and the second region being a region which is closer to a longitudinally central portion of the discharge port of the casting die than the first region.

Another aspect of the present invention is a casting die for casting a resin solution containing a transparent resin onto a running support to form a cast membrane, the casting die including, on an outer surface of the casting die and above longitudinally opposite ends of a discharge port, feeding ports for supplying a solvent capable of dissolving the transparent resin, wherein a surface energy of a first region which is surrounded by the feeding ports and the longitudinally opposite ends of the discharge port of the casting die is 10 mN/m to 30 mN/m higher than a surface energy of a second region which is closer to a longitudinally central portion of the discharge port of the casting die than the first region.

Another aspect of the present invention is a device for producing a resin film, including a support that is able to run, a casting die for casting a resin solution containing a transparent resin onto the running support to form a cast membrane on the support and a releasing portion that releases the cast membrane from the support, wherein the casting die is the above-described casting die.

Another aspect of the present invention is a resin film obtained by the method for producing a resin film described above.

Another aspect of the present invention is a polarizing plate including a polarizing element and a transparent protective film disposed on a surface of the polarizing element, wherein the transparent protective film is the above-described resin film.

Another aspect of the present invention is a liquid crystal display device including a liquid crystal cell and two polarizing plates disposed to sandwich the liquid crystal cell therebetween, wherein at least one of the two polarizing plates is the above-described polarizing plate.

The objects, features, aspects, and advantages of the present invention will be more apparent from the detailed description below and the attached drawings.

BEST MODE FOR CARRYING OUT THE INVENTION

Figure 1:
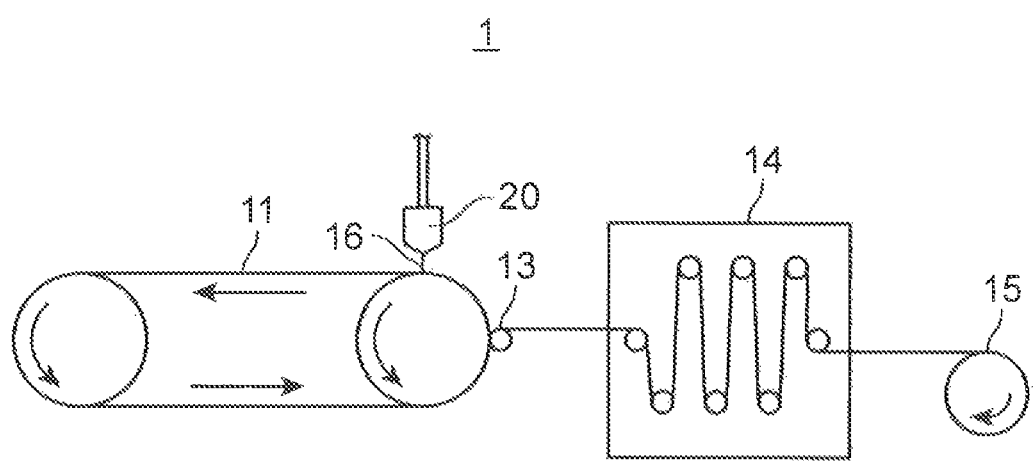
FIG. 1 is a schematic diagram showing a basic configuration of a resin film producing device according to an embodiment of the present invention.

According to the evaluation by the present inventor, it may be difficult to sufficiently suppress the formation of membranes at the outer surface around both ends of a discharge port of a casting die according to the producing methods described in Patent Documents 1 and 2.

It may also be difficult to sufficiently suppress the formation of membranes at the outer surface around both ends of a discharge port of a casting die even when the producing methods disclosed in Patent Documents 1 and 2 are combined with the means which allows a solvent capable of dissolving a transparent resin contained in a dope to fall from longitudinally opposite ends of the discharge port of the casting die. This may be due to the following reason: the casting dies used in the producing methods disclosed in Patent Documents 1 and 2 have been subjected to surface treatment on the whole surface along the longitudinal direction of the discharge port and the solvent flowing on the outer surface of the casting dies may have disturbed flow.

According to the evaluation by the present inventor, the producing method disclosed in Patent Document 3 may not sufficiently suppress the formation of membranes at the outer surface around both ends of a discharge port of a casting die over a prolonged time. This may be due to the following reason: when the resin film is produced over a prolonged time, a dirt and the like may be deposited in the region where the liquid pool is formed, thereby making it difficult to stably supply the anticoagulant liquid.

Thus the present inventor presumed the reasons why membranes derived from a dope, i.e. so-called membrane burrs, are produced at the outer surface of the casting die as follows.

The present inventor first thought that among membranes formed at the outer surface of the casting die, membranes formed on the outer surface around longitudinally opposite ends of the discharge port of the casting die and membranes formed at the outer surface around a longitudinally central portion of the discharge port of the casting die are resulting from different reasons.

Specifically, the present inventor presumed that the membranes formed on the outer surface around longitudinally opposite ends of the discharge port of the casting die are formed because a solvent in a dope flowing around the longitudinally opposite ends of the discharge port is dried due to the reason that the vicinity of the both ends tends to be exposed to external air.

The present inventor also presumed that the membranes formed at the outer surface around the longitudinally central portion of the discharge port of the casting die are formed because a dope discharged from the discharge port expands to adhere at the outer surface around the longitudinally central portion of the discharge port of the casting die and the solvent in the dope is dried.

In view of the above, the present inventor focused to suppress production of both membranes described above and carried out various investigations. As a result, the present inventor achieved the present invention described hereinbelow in which an anti-solidification liquid, which is a solvent capable of dissolving a transparent resin, a constituent of a resin film, is allowed to fall from the longitudinally opposite ends of the discharge port of the casting die and the casting die has different physical properties on the outer surface thereof depending on the positions along the longitudinal direction of the discharge port of the casting die.

An embodiment of the method for producing a resin film according to the present invention is illustrated as follows, which does not limit the present invention.

The method for producing a resin film according to the present embodiment is based on a so-called solution cast film-forming method including a casting step of casting a resin solution (dope) containing a transparent resin from a casting die onto a running support to form a cast membrane (web) and a releasing step of releasing the cast membrane from the support as a film. Furthermore, the method for producing a resin film generally includes, in addition to these steps, a drying step of drying the released film, and may further include a stretching step of stretching the released film. The method for producing a resin film is carried out by such a device as shown in FIG. 1, which produces a resin film in accordance with a solution cast film-forming method. The device for producing a resin film is not limited to the device shown in FIG. 1 but may have another configuration. Furthermore, FIG. 1 is a schematic diagram showing a basic configuration of the device for producing a resin film according to an embodiment of the present invention.

According to the method for producing a resin film according to the present embodiment, in the casting step, the resin solution is discharged from the discharge port of the casting die onto the support to cast the solution while a solvent capable of dissolving the transparent resin is flowed on the outer surface of the casting die from the positions above longitudinally opposite ends of the discharge port of the casting die toward the longitudinally opposite ends of the discharge port of the casting die, so that the solvent falls from the longitudinally opposite ends of the discharge port of the casting die, and the casting die has a surface energy of a first region which is 10 mN/m to 30 mN/m higher than a surface energy of a second region, the first region being the region, on the outer surface of the casting die, surrounded by the positions above the longitudinally opposite ends of the discharge port of the casting die and the longitudinally opposite ends of the discharge port of the casting die, and the second region being a region which is closer to a longitudinally central portion of the discharge port of the casting die than the first region. Thus the casting die used has the value "(surface energy of the first region)−(surface energy of the second region)" of 10 mN/m to 30 mN/m.

When the surface energy of the first region is too high compared to the surface energy of the second region, the liquid repellent property of the first region is too low, so that the solvent capable of dissolving the transparent resin, a constituent of the resin film, i.e. the anti-solidification liquid, may have excessively decreased flow on the first region. When the surface energy of the first region is not sufficiently high compared to the surface energy of the second region, generation of troubles such as dot troubles on the resulting resin film caused by scattered anti-solidification liquid in other regions than the first region may not be sufficiently prevented. The reason for this may be considered as follows: the first region may have excessively high liquid repellent property, making the flow of the anti-solidification liquid on the first region being too fast. Namely, the anti-solidification liquid may not be sufficiently suppressed from scattering from the first region toward the second region and skewing of the flow of the dope may not be sufficiently suppressed in the first region.

Thus by using the casting die having the value (surface energy of the first region)−(surface energy of the second region) of 10 mN/m to 30 mN/m, a resin film can be produced while suppressing the formation of membranes derived from the resin solution used for production of the resin film on the outer surface of the casting die.

Furthermore, in this case, the surface energy can be measured by a well-known method. Specifically, the respective contact angles of a plurality of types of liquids for which surface free energy and the components thereof (a dispersion force component, a polarity component, and a hydrogen binding component) are known are measured, and then, the surface energy can be calculated based on the plurality of contact angles measured.

More specifically, the measurement can be carried out as follows.

First, the surface energy of a liquid has a dispersion force component, a polarity component, and a hydrogen binding component as shown in:

$$\gamma_L = \gamma_L^d + \gamma_L^p + \gamma_L^h \quad \text{(a)}.$$

In the expression, $\gamma$ denotes surface energy, $\gamma^d$ denotes the dispersive component of the surface energy, $\gamma^p$ denotes the polarity component of the surface energy, and $\gamma^h$ denotes the hydrogen binding component of the surface energy. The subscript L added to each $\gamma$ denotes a liquid.

The liquid may have only a dispersive component, have both a dispersive component and a polarity component but no hydrogen binding component, or have both a dispersive component and a hydrogen binding component but no polarity component depending on the type thereof. All the components may be known components.

Specifically, for n-hexadecane, $\gamma_L^d$ is 27.6 mN/m and both $\gamma_L^p$ and $\gamma_L^h$ are 0 mN/m. For methylene iodide, $\gamma_L^d$ is 46.8 mN/m, $\gamma_L^p$ is 4 mN/m, and $\gamma_L^p$, is 0 mN/m. For water, $\gamma_L^d$ is 29.1 mN/m, $\gamma_L^p$ is 1.3 mN/m, and $\gamma_L^h$ is 42.4 mN/m. For ethylene glycol, $\gamma_L^d$ is 30.1 mN/m, $\gamma_L^p$ is 0 mN/m, and $\gamma_L^h$ is 17.6 mN/m.

That is, n-hexadecane has only a dispersive component. Methylene iodide has both a dispersive component and a polarity component but no hydrogen binding component. Water has all of the three components. Ethylene glycol has both a dispersive component and a hydrogen binding component but no polarity component.

First, 3 mm³ of n-hexadecane, having only a dispersive component, was dropped, and a static contact angle was measured using a contact angle gauge (trade name PG-X produced by MATSUBO Corporation). At intervals of 10 mm in the width direction of a disassembled dice over the range of 300 mm from a widthwise end of the dice, the contact angle was measured at three points, that is, at each position and the vicinities thereof, and the measured values were averaged. The contact angle obtained can be used to calculate the dispersive component $\gamma_S^d$ of the surface energy of the dice, which is a measurement target, in accordance with:

$$Wa = \gamma_L(1+\cos\theta) \text{ (Yong-Dupre's equation)} \quad \text{(b); and}$$

$$Wa = 2(\gamma_S^d \gamma_L^d)^{1/2} + 2(\gamma_S^p \gamma_L^p)^{1/2} + 2(\gamma_S^h \gamma_L^h)^{1/2} \quad \text{(c).}$$

The subscript S added to each γ denotes a solid, and Wa denotes work of adhesion.

Subsequently, for methylene iodide, having both a dispersive component and a polarity component and no hydrogen binding component, the contact angle is measured by a method similar to the above-described method. Then, the polarity component $\gamma_S^p$ of the surface energy of the die, which is a measurement target, can be calculated in accordance with Expression (b) and Expression (c) described above, using the contact angle obtained and a previously calculated dispersive component $\gamma_S^d$.

Moreover, for water, having all of the three components, the contact angle is measured by a method similar to the above-described method. Then, the hydrogen binding component $\gamma_S^h$ of the surface energy of the die, which is a measurement target, can be calculated in accordance with Expression (b) and Expression (c) described above, using the obtained contact angle, and the previously calculated dispersive component $\gamma_S^d$ and polarity component $\gamma_S^p$.

Then, using the dispersive component $\gamma_S^d$, polarity component $\gamma_S^p$, and hydrogen binding component $\gamma_S^h$ calculated by the above-described method, the surface energy $\gamma_S$ of the die, which is a measurement target, can be calculated in accordance:

$$\gamma_S = \gamma_S^d + \gamma_S^p + \gamma_S^h \quad \text{(d).}$$

For example, the surface energy $\gamma_S$ of the casting die surface can be calculated as described above.

One of the ends described above is a region which covers 0.1% to 0.5% of the length along the longitudinal direction of the discharge port from the edge of the discharge port. Namely, the both ends refer to two regions which respectively cover 0.1% to 0.5% of the length along the longitudinal direction of the discharge port from each edge of the discharge port. The central portion refers to the region other than the both ends. Specifically, when the length along the longitudinal direction of the discharge port is 3,000 mm, for example, one end among both ends is a region which covers 3 mm to 15 mm from the edge of the discharge port. The both ends are the regions which respectively cover 3 mm to 15 mm from each edge of the discharge port, so that the region covering the central portion has the length along the longitudinal direction of 2,970 mm to 2,994 mm.

The outer surface of the casting die means the side surface of the casting die upstream or downstream along the running direction of the endless belt support 11. The outer surface of the casting die is preferably the side surface of the casting die downstream along the running direction of the endless belt support 11. Due to this, the anti-solidification agent can be mounted on the upper surface of the edge of the cast membrane discharged from the discharge port, so that the production of membrane burrs can be suitably suppressed.

FIG. 1 is a schematic diagram showing a basic configuration of a device 1 for producing a resin film by a solution cast method using an endless belt support 11. The device 1 for producing a resin film includes the endless belt support 11, a casting die 20, a releasing roller 13, a drying device 14, and a winding device 15. The casting die 20 discharges a resin solution (dope) 16 containing a transparent resin in the form of a ribbon to cast the resin solution 16 onto a surface of the endless belt support 11. The endless belt support 11 is supported so as to be able to be driven by a pair of a driving roller and a driven roller. The endless belt support 11 allows the resin solution 16 cast by the casting die 20 to be formed into a cast membrane (web) and conveys the cast membrane, while drying the cast membrane to the degree that the cast membrane can be released by the releasing roller 13. The releasing roller 13 releases the dried cast membrane from the endless belt support 11. The released cast membrane is further dried by the drying device 14. The dried cast membrane is wound around the winding device 15 to obtain a resin film.

As shown in FIG. 1, the endless belt support 11 is a metal endless belt having a mirror surface and running infinitely. The belt is preferably formed of, for example, stainless steel in view of its ability to release the cast membrane from the endless belt support 11. The width of the cast membrane cast by the casting die 20 is preferably set to 80% to 99% of the width of the endless belt support 11 in view of the effective use of the width of the endless belt support 11. To eventually obtain a resin film with a width of 1,500 mm to 4,000 mm, the endless belt support 11 preferably has a width of 1,800 mm to 4,500 mm. Alternatively, instead of the endless belt support, a metal drum having a mirror surface and which is rotatable (endless drum support) may be used.

The casting die is not particularly limited as far as it allows the above method for producing a resin film being carried out. Specifically, the casting die may be, for example, a casting die which allows casting of a resin solution containing a transparent resin onto a running support to form a cast membrane, wherein the casting die includes, on the outer surface of the casting die and above longitudinally opposite ends of a discharge port, feeding ports for supplying a solvent capable of dissolving the transparent resin, and a surface energy of a first region which is surrounded by the feeding ports and the longitudinally opposite ends of the discharge port of the casting die is 10 mN/m to 30 mN/m higher than a surface energy of a second region which is closer to a longitudinally central portion of the discharge port of the casting die than the first region. The specific casting die may be as follows.

Figure 2:
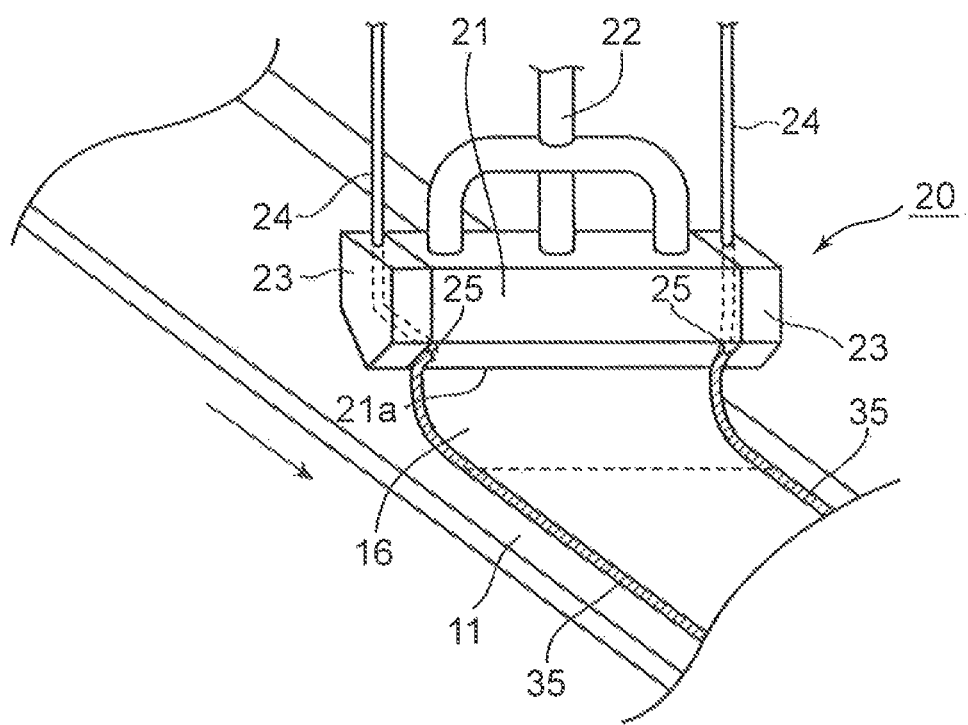
FIG. 2 is a schematic perspective view showing surroundings of a casting die according to the embodiment of the present invention.
Figure 3:
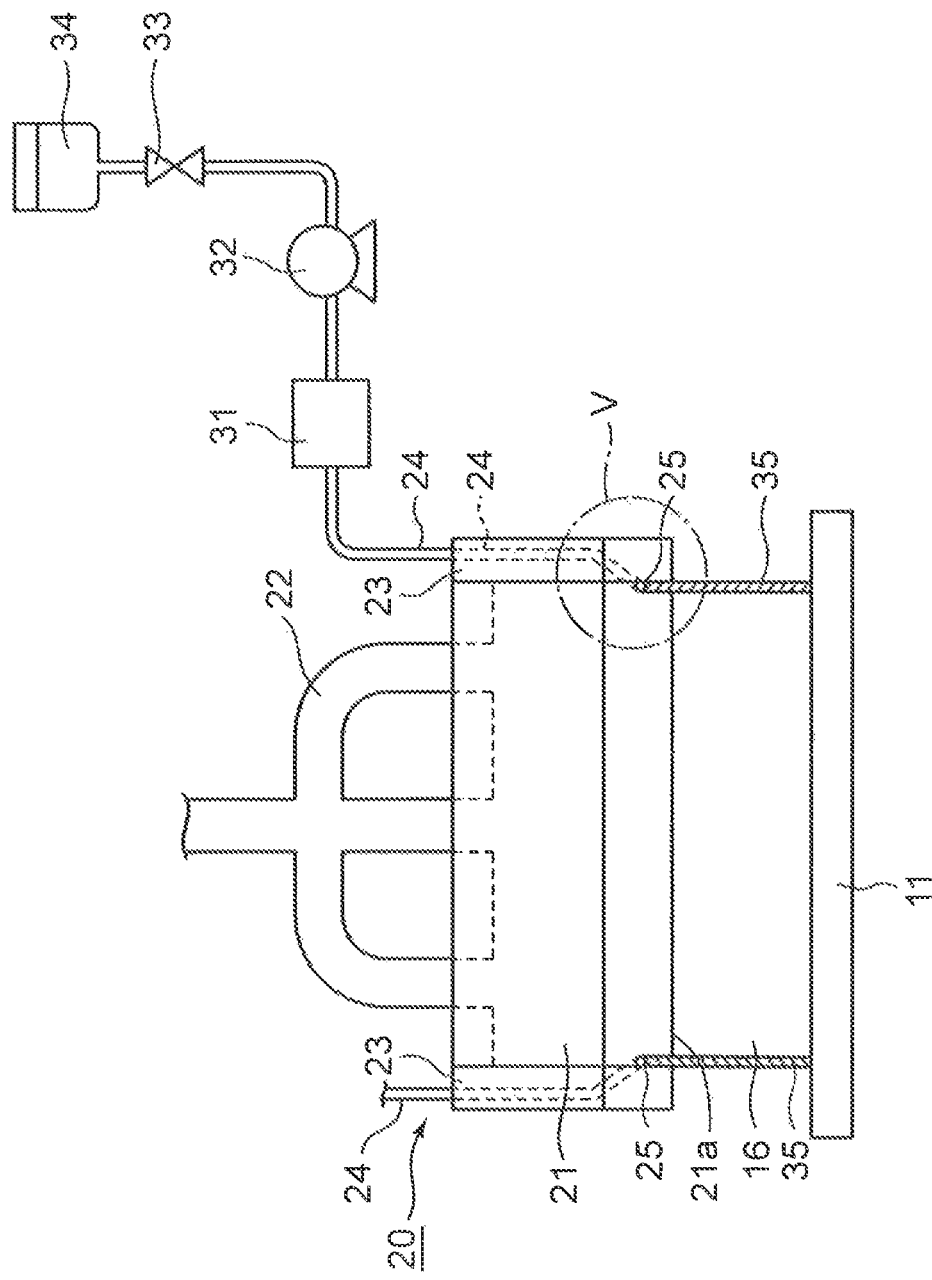
FIG. 3 is a side view of the casting die as viewed from a downstream side of the running direction of an endless belt support according to the embodiment of the present invention.
Figure 4:
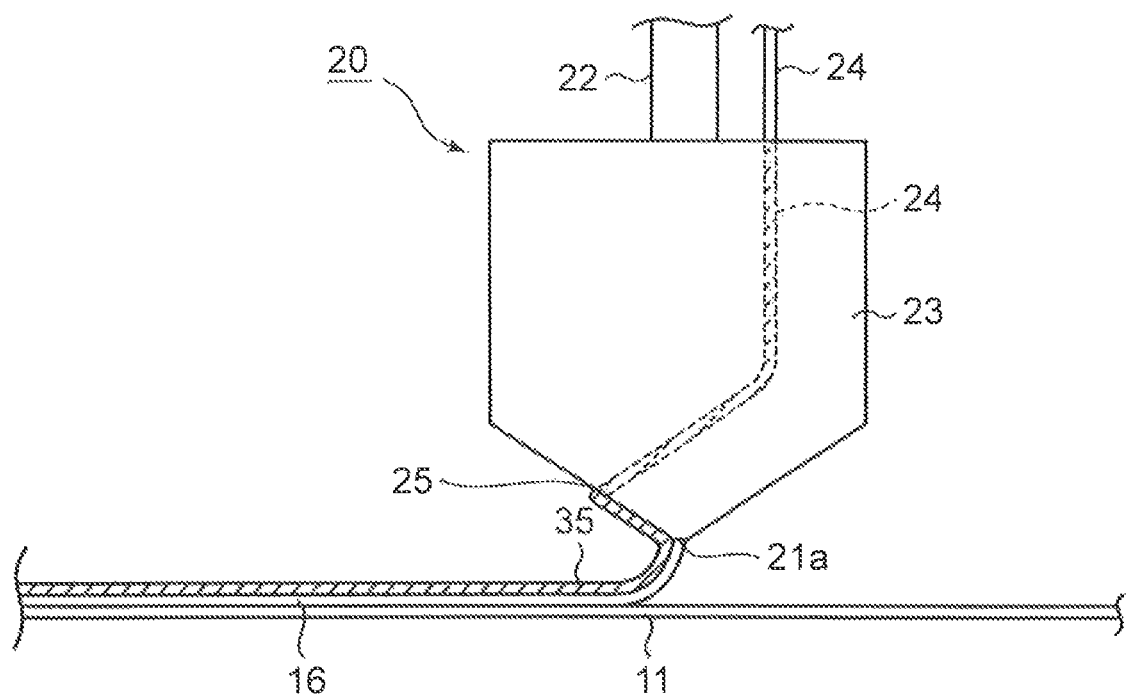
FIG. 4 is a side view of the casting die as viewed from the direction orthogonal to the running direction of the endless belt support according to the embodiment of the present invention.
Figure 5:
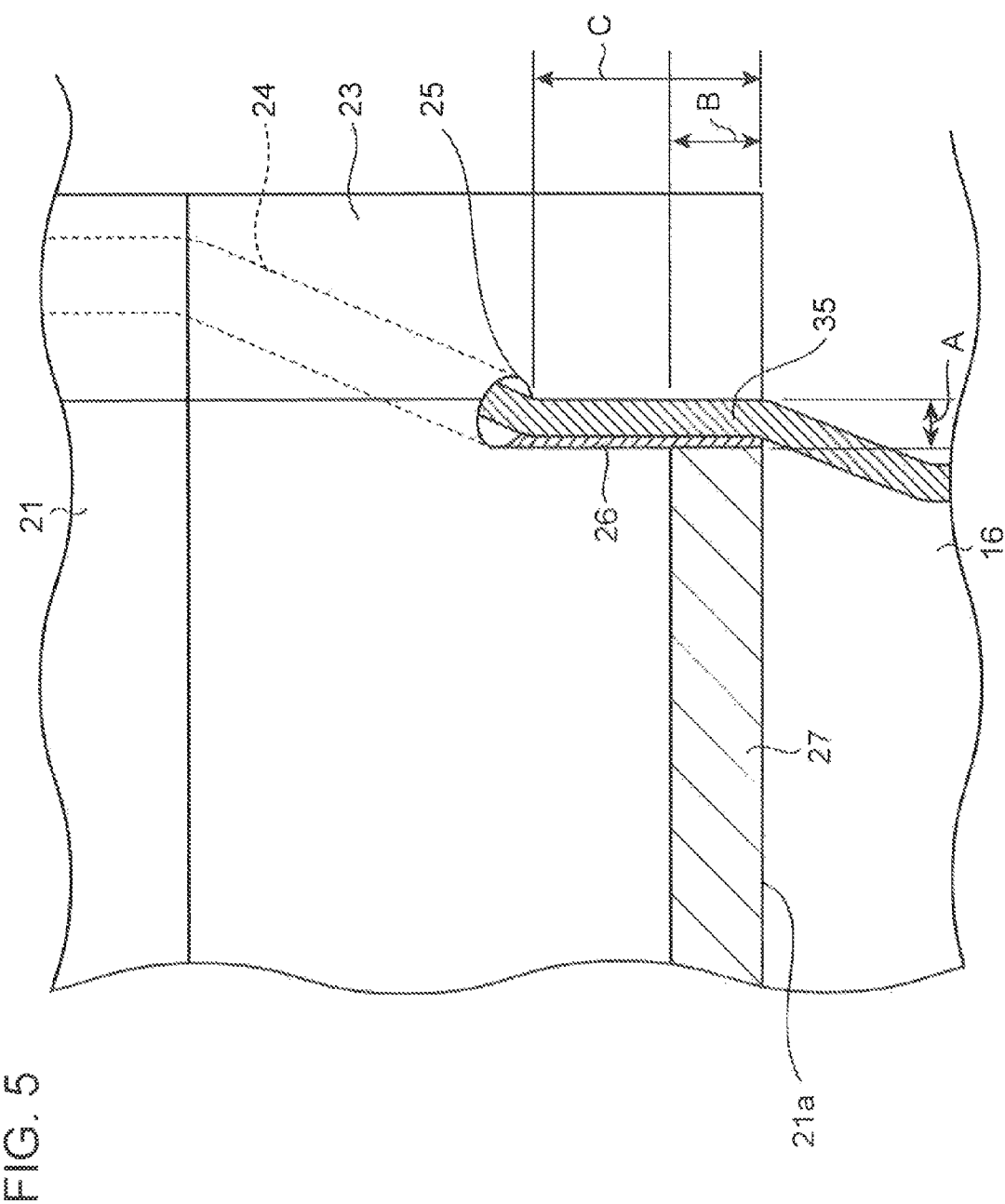
FIG. 5 is an enlarged view of surroundings of a solvent feeding port of the casting die shown in FIG. 3.

FIG. 2 is a schematic perspective view showing surroundings of the casting die 20. FIG. 3 is a side view of the casting die 20 as viewed from a downstream side of the running direction of the endless belt support 11. FIG. 4 is a side view of the casting die as viewed from the direction orthogonal to the running direction of the endless belt support 11. FIG. 5 is an enlarged view of surroundings of a solvent feeding port 25 of the casting die 20 shown in FIG. 3.

As shown in FIGS. 2 to 5, the casting die 20 includes a casting die main body 21, a dope feeding pipe 22, side panels 23 and solvent feeding pipes 24.

The dope feeding pipe 22 is connected to an upper end of the casting die main body 21 to feed the dope 16 into the casting die main body 21.

The casting die main body 21 allows the dope 16 being flowed therein. The casting die main body 21 is provided with a discharge port 21a for discharging the dope 16 toward the endless belt support 11. As shown in FIG. 2, the discharge port 21a is formed on a ridge line of the casting die main body 21 which is closer to the endless belt support 11. The ridge line extends in a direction substantially orthogonal to the running direction of the endless belt support 11. A distance between the discharge port 21a and the endless belt support 11 is preferably 200 µm to 5,000 µm. When the distance is excessively short, the casting die 20 may come into contact with the endless belt support 11. When the distance is excessively long, the dope in a ribbon shape (cast ribbon) which is discharged from the discharge port 21a tends to be affected by an external factor such as wind.

The side panels 23 are provided on longitudinally opposite ends of the casting die main body 21 (the direction substantially orthogonal to the running direction of the endless belt support 11). The distance between the side panels 23 provided on longitudinally opposite ends of the casting die main body 21 defines, as shown in FIG. 3, the length of the discharge port 21a along the longitudinal direction of the casting die main body 21, namely the width of the resin solution 16 in a ribbon shape.

The solvent feeding pipes 24 feed a solvent (anti-solidification liquid) 35 capable of dissolving the transparent resin at positions above longitudinally opposite ends of the discharge port 21a on the outer surface of the casting die main body 21. The solvent feeding pipe 24 is connected to the upper end of the side panel 23 and allows the anti-solidification liquid 35 being flowed therein. The solvent feeding pipes 24 penetrate the casting die 20 mainly through the side panels 23 and are connected to the positions above longitudinally opposite ends of the discharge port 21a on the outer surface of the casting die main body 21. Namely, the solvent feeding pipes 24 form solvent feeding ports 25 for supplying the anti-solidification liquid 35 at the positions above longitudinally opposite ends of the discharge port 21a on the outer surface of the casting die main body 21. Although FIG. 4 is a side view of the casting die 20, it also shows the solvent feeding pipe 24 in the casting die 20 with broken lines.

The solvent feeding pipe 24 is also connected to, in the order from a downstream side of the flowing direction of the solvent, a flow detector 31, a liquid feeder 32, a valve 33 and a solvent reservoir 34. The solvent reservoir 34 reserves the solvent (anti-solidification liquid) 35 capable of dissolving the transparent resin. The valve 33, upon its opening, starts the flow of the solvent 35 reserved in the solvent reservoir 34 into the solvent feeding pipe 24. The liquid feeder 32 feeds the solvent 35 in the solvent feeding pipe 24 toward the side panel 23. The flow detector 31 detects the flow rate of the solvent 35 flowing in the solvent feeding pipe 24. The output of the liquid feeder 32 may be controlled based on the detection result. Accordingly, as shown in FIG. 3, the solvent 35 supplied in the side panel 23 flows to the solvent feeding port 25 in the casting die 20 mainly through the side panel 23. The solvent 35 then flows, from the solvent feeding ports 25 toward longitudinally opposite ends of the discharge port 21a of the casting die main body 21, on the side surface of the casting die 20 on the downstream side of the running direction of the endless belt support 11 and falls from longitudinally opposite ends of the discharge port 21a of the casting die main body 21. Namely, the solvent 35 falls so that it is mounted on both ends of the cast membrane.

As shown in FIG. 3, the dope feeding pipe 22 branches into three pipes connected to the casting die main body 21. However, the number of branches is not limited. The dope feeding pipe 22 may have no branch, two branches, or four or more branches. The number of branches from the dope feeding pipe 22 is preferably two to four so as to allow the dope 16 to be stably supplied to the casting die main body 21.

The solvent feeding ports 25 are, as shown in FIG. 5, provided on the side surface of the casting die 20 on the downstream side of the running direction of the endless belt support 11. First regions 26 of the casting die 20, which are surrounded by the lower end surfaces of the solvent feeding ports 25 and longitudinally opposite ends of the discharge port 21a of the casting die main body 21, and second regions 27, which are the regions that are closer to a longitudinally central portion of the discharge port 21a than the first regions 26, are surface treated so that the surface energy of the first regions 26 is 10 mN/m to 30 mN/m higher than the surface energy of the second regions 27.

The first region 26 is not particularly limited as far as it meets the above relationship. Specifically, the first region 26 may be, for example, a region subjected to roughening treatment. The roughening treatment is not particularly limited and may include, for example, abrasion with a sandpaper and the like.

It is also preferable that the first region 26 has the surface roughness as ten-point height of irregularities Rz of 1,000 nm to 8,000 nm, thereby the formation of membranes derived from the resin solution used for production of the resin film on the outer surface of the casting die 20 can further be suppressed. The reason for this may be as follows: when the first region 26 has the surface roughness within the above range, scattering of the anti-solidification liquid 35 from the first region 26 to the second region 27 and skewing of the flow of the dope in the first region 26 may be further suppressed. Therefore, the anti-solidification liquid 35 may further suitably fall at positions along the width direction of the dope discharged from the discharge port 21a. Thus troubles such as dot troubles on the resulting resin film due to scattering of the anti-solidification liquid 35 on other regions than the first region 26 may be further suppressed while the formation of membranes on the outer surface around longitudinally opposite ends of the discharge port 21a may also be further suppressed.

The ten-point height of irregularities Rz can be determined according to the conventional measurement method. Specifically, the method may include the one according to JIS B0601: 2001 and the like.

The second region 27 is not particularly limited as far as it meets the above relationship. Specifically, the second region 27 may be, for example, a region subjected to resin coating treatment or plate processing. The resin coating treatment may include, but not limited to, for example, a coating treatment with a fluororesin (fluororesin coating treatment) and the like. More specifically, the treatment may include, for example, a coating treatment with Cytop produced by Asahi Glass Co., Ltd or a polytetrafluoroethylene (PTFE) or a tetrafluoroethylene-perfluoroalkyl vinyl ether copolymer (PFA) produced by Iwaki Coating Ind., Ltd. and the like. The plate processing may include, but not limited to, for example, a plate processing using ultra chrome produced by Extrusion Die Industries (EDI) and the like.

The first region 26 preferably has the width A, i.e., the length A in the direction parallel to the longitudinal direction of the discharge port 21*a* of 1 mm to 10 mm, more preferably 3 mm to 10 mm. When the width A of the first region 26 is too short, the suppression effect of the formation of membranes on the outer surface around longitudinally opposite ends of the discharge port 21*a* may not be sufficiently obtained. When the width A of the first region 26 is too long, the dope discharged from the discharge port 21*a* may expand in the width direction to adhere on the outer surface around the discharge port 21*a*, resulting in formation of membranes, in the first region 26, which are generally formed on the outer surface around the longitudinally central portion of the discharge port 21*a* by evaporation of the solvent in the dope. Thus when the width A of the first region 26 is within the above range, the formation of membranes on the outer surface of the casting die 20 derived from the resin solution used for production of the resin film may be further suppressed. This may be because of the following reason: by selecting the length of the first region 26 in the direction parallel to the longitudinal direction of the discharge port 21*a* within the above range, the effect for suppressing the formation of membranes on the outer surface around longitudinally opposite ends of the discharge port 21*a* and the effect for suppressing the formation of membranes on the outer surface around the longitudinally central portion of the discharge port 21*a* may be both appropriately provided.

It is further preferable that the first region 26 has the surface roughness as ten-point height of irregularities Rz of 1,000 nm to 8,000 nm and the width A, i.e. the length A in the direction parallel to the longitudinal direction of the discharge port 21*a* of 3 mm to 10 mm. Accordingly, the formation of membranes derived from the resin solution used for production of the resin film on the outer surface of the casting die 20 can be further suppressed.

It is also preferable that the second region 27 has the width B, i.e. the length B in the direction orthogonal to the longitudinal direction of the discharge port 21*a* of 10 mm to 100 mm. When the width B of the second region 27 is too short, the production of the membranes on the outer surface around the longitudinally central portion of the discharge port 21*a* may not be sufficiently suppressed. When the width B of the second region 27 is too long, on the other hand, the suppression effect of membranes may not significantly increase and the area to be surface treated may be unnecessarily large, resulting in economical disadvantages.

The first region 26 preferably has the length C, i.e. the length C in the direction orthogonal to the longitudinal direction of the discharge port 21*a* of 0.5 mm to 20 mm, more preferably 1 mm to 15 mm. When the length C of the first region 26 is too short, the flow of the solvent 35 in the first region 26 may be destabilized, so that the formation of membranes at longitudinally opposite ends of the discharge port 21*a* may not be sufficiently suppressed. When the length C of the first region 26 is too long, the solvent 35 flowing in the first region 26 may scatter to the second region 27 and the like to cause dot troubles derived from the scattered solvent on the resulting resin film.

The supply rate (dripping rate) of the solvent (anti-solidification liquid) 35 is not particularly limited as far as the formation of membranes on the outer surface around the longitudinal ends of the discharge port 21*a* is sufficiently suppressed. Specifically, the amount supplied from one solvent feeding pipe 24 is, for example, preferably 0.1 ml/min to 3 ml/min, more preferably 0.2 ml/min to 1 ml/min.

In the casting die 20, the solvent feeding pipe 24 may not pass through the casting die 20 as described above but may be provided on the side surface of the casting die 20 on a downstream side of the running direction of the endless belt support 11, as described hereinbelow.

Figure 6:
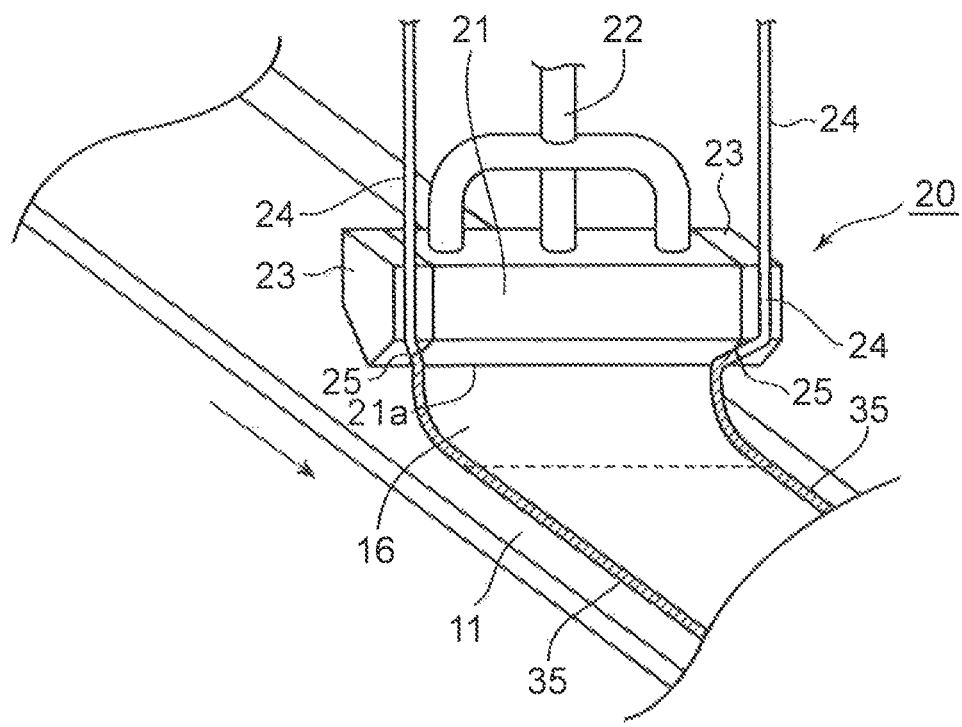
FIG. 6 is a schematic perspective view showing surroundings of the casting die according to another embodiment of the present invention.
Figure 7:
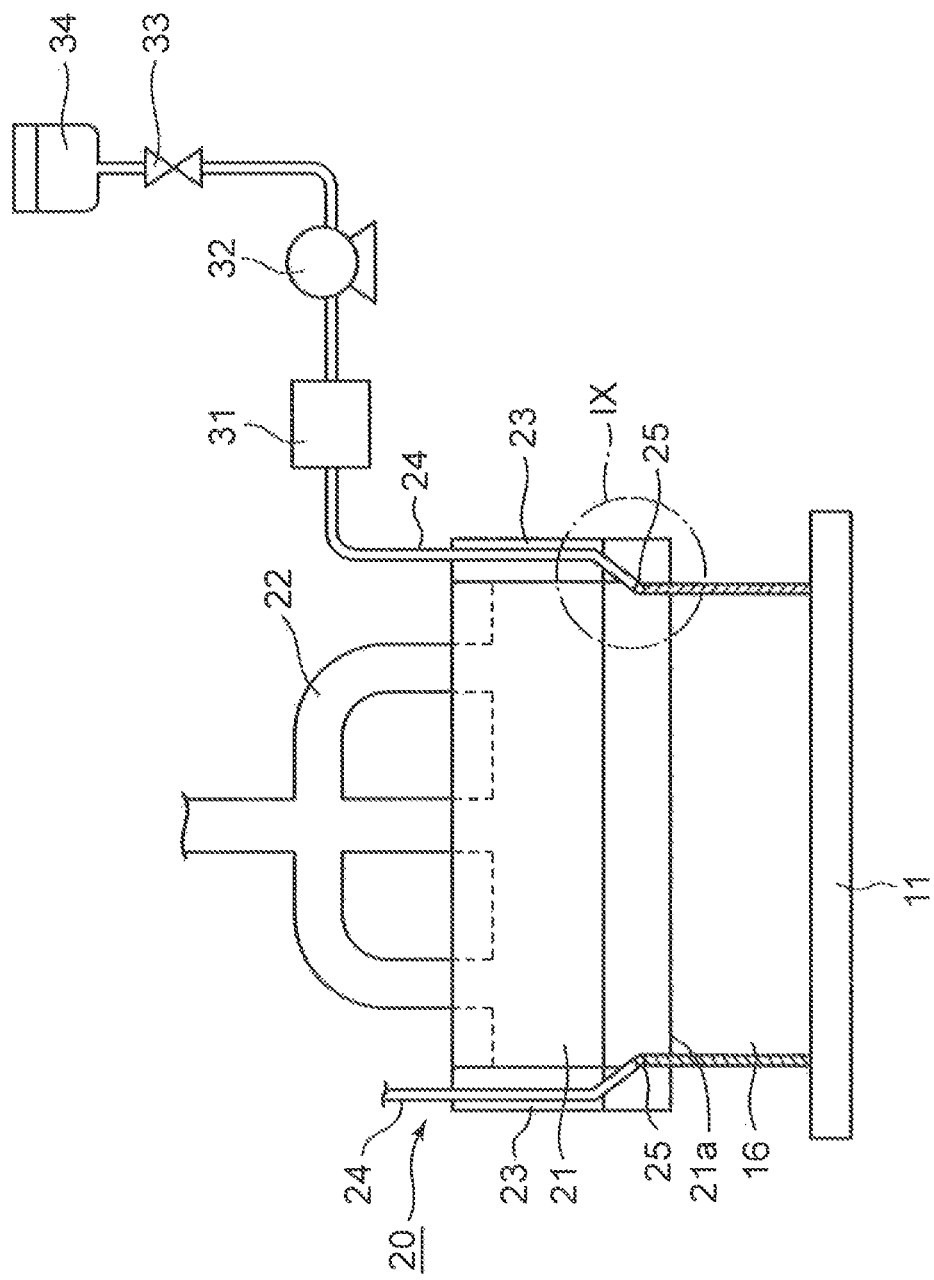
FIG. 7 is a side view of the casting die as viewed from a downstream side of the running direction of an endless belt support according to another embodiment of the present invention.
Figure 8:
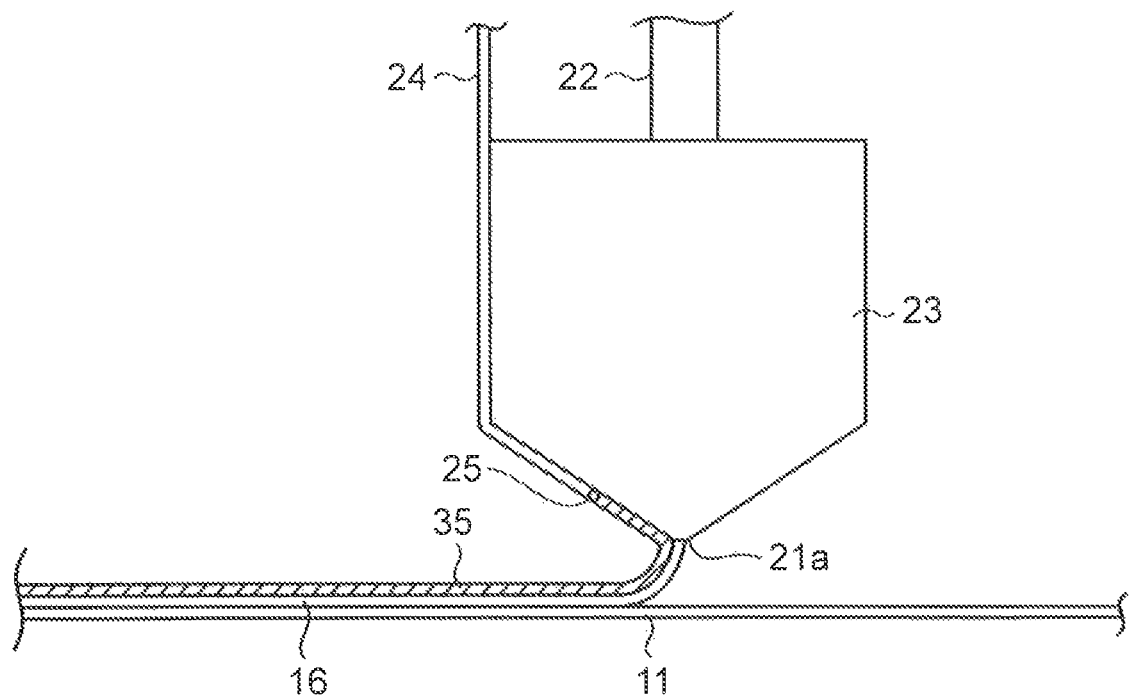
FIG. 8 is a side view of the casting die as viewed from the direction orthogonal to the running direction of the endless belt support according to another embodiment of the present invention.
Figure 9:
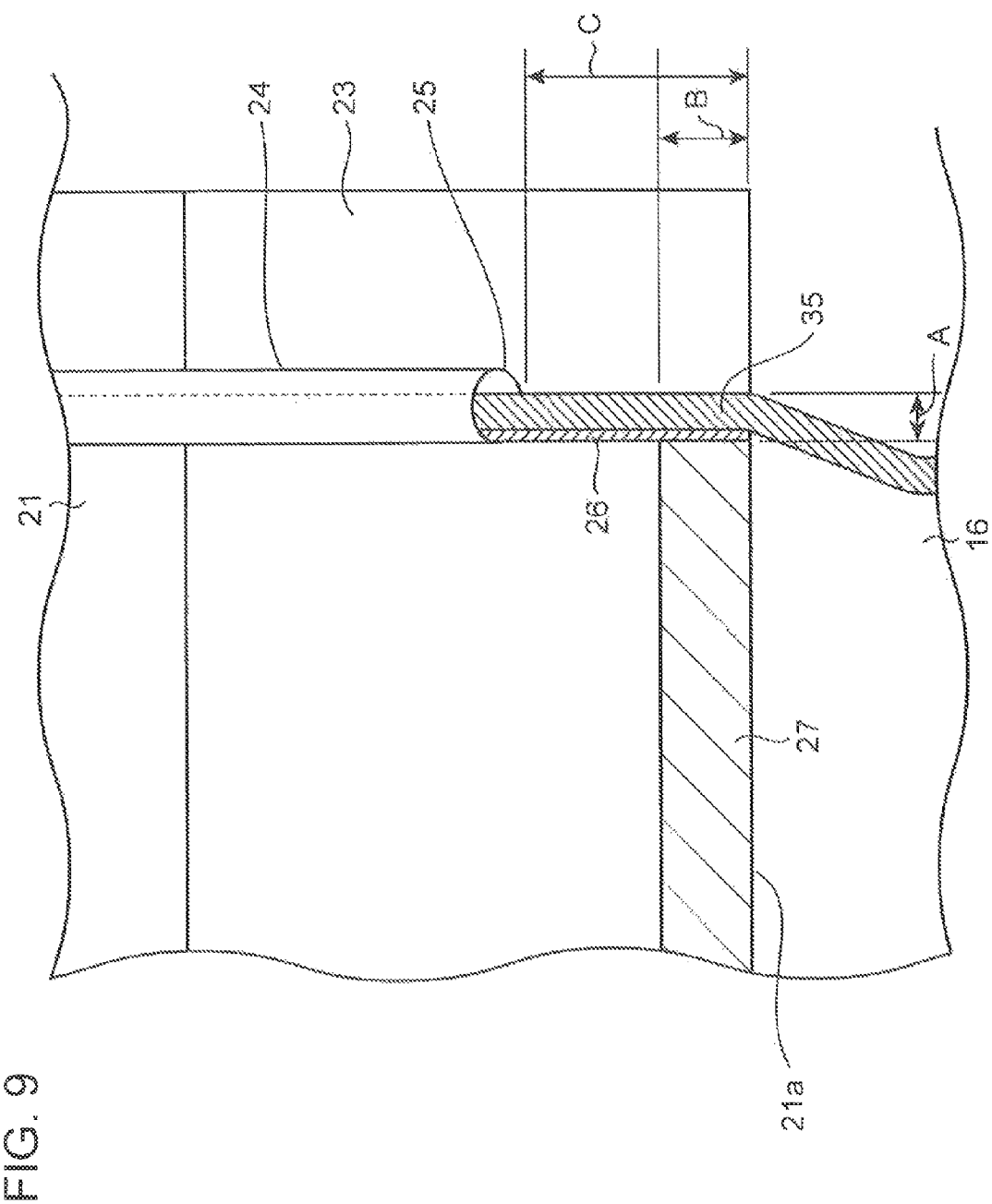
FIG. 9 is an enlarged view of surroundings of a solvent feeding port of the casting die shown in FIG. 7.

FIG. 6 is a schematic perspective view showing surroundings of the casting die 20. FIG. 7 is a side view of the casting die 20 as viewed from a downstream side of the running direction of the endless belt support 11. FIG. 8 is a side view of the casting die as viewed from the direction orthogonal to the running direction of the endless belt support 11. FIG. 9 is an enlarged view of surroundings of the solvent feeding port 25 of the casting die 20 shown in FIG. 7. The descriptions for the casting die 20 in FIGS. 6 to 9 which are the same as those for the casting die 20 in FIGS. 2 to 5 are omitted.

Solvent feeding pipes 24 are provided on the side surface of the casting die 20 on the downstream side of the running direction of the endless belt support 11, so that they form the solvent feeding ports 25 for feeding the anti-solidification liquid 35 at the positions above the longitudinally opposite ends of the discharge port 21*a* on the outer surface of the casting die main body 21.

The casting die 20 shown in FIGS. 6 to 9 is the same as the casting die 20 shown in FIGS. 2 to 5 except for the position where the solvent feeding pipes 24 are provided.

A resin film can be produced with the casting die 20 as above while suppressing the formation of membranes derived from a resin solution used for production of the resin film on the outer surface of the casting die 20.

Then, a resin film can be produced by using the releasing roller 13, the drying device 14, the winding device 15, and the like to carry out a releasing step and a drying step on the cast membrane (web) formed on the endless belt support 11. Steps described below are not particularly limited, and any common steps may be adopted. Specifically, for example, the following steps may be used. The present invention is not limited to the following steps.

First, the cast membrane formed (web) is conveyed on the endless belt support 11, with the solvent in the dope dried. The drying is carried out by, for example, heating the endless belt support 11 or blowing heated air against the web. At this time, the temperature of the web is preferably set to −5° C. to 70° C. and more preferably 0° C. to 60° C. taking into account a conveying speed associated with a time required to evaporate the solvent, the degree of dispersion of particulates, productivity, and the like, though the temperature also depends on the dope solution. The web temperature is preferably high because the speed at which the solvent is dried increases consistently with the web temperature. However, an excessively high web temperature tends to cause the solvent to be bubbled or to degrade the planarity of the web.

Examples of a method for heating the endless belt support 11 include, for example, heating the web on the endless belt support 11 by an infrared heater, heating a front surface and a back surface of the endless belt support 11 by the infrared heater, and heating the back surface of the endless belt support 11 by blowing heated air against the back surface. Any of these methods may be selected as appropriate.

Furthermore, if heated air is blown against the endless belt support 11, the wind pressure of the heated air is preferably set to 50 Pa to 5,000 Pa, taking the uniformity of solvent evaporation and the degree of dispersion of particulates into account. During the drying, the temperature of the heated air may be maintained constant or varied among several levels of temperatures in the running direction of the endless belt support 11.

A time from the casting of the dope onto the endless belt support 11 until the web is released from the endless belt support 11 is preferably set within the range of 0.5 minutes to 5 minutes taking into account the ability to release the web from the endless belt support 11, though the time also depends on the film thickness of the resin film to be produced and the solvent used.

Preferably, the running speed of the endless belt support 11 is, for example, about 60 m/min to 150 m/min. This allows efficient production of a resin film while suppressing the formation of membranes derived from a resin solution used for production of a resin film on the outer surface of the casting die 20. Thus, when the endless belt support 11 runs at a relatively high speed, the resin film can be efficiently produced but generally tends to cause the formation, on the outer surface of the casting die 20, of membranes derived from a resin solution used for production of a resin film. However, the method for producing a resin film according to the present embodiment enables an increase in production efficiency, while suppressing the formation of the membranes.

Furthermore, the ratio (draft ratio) of the running speed of the endless belt support 11 to the flow velocity of the dope discharged from the casting die 20 is preferably about 0.5 to 2. When the draft ratio falls within this range, a cast membrane can be stably formed. For example, an excessively high draft ratio tends to cause a neck-in phenomenon in which the cast membrane is contracted in the width direction thereof, making the formation of wide resin films difficult.

The releasing roller 13 is disposed close to the surface of the endless belt support 11 on which the dope 16 is cast. The distance between the endless belt support 11 and the releasing roller 13 is preferably 1 mm to 100 mm. The dried cast membrane (web) is pulled under tension using the releasing roller 13 as a supporting point. Thus, the dried cast membrane (web) is released to obtain a film. When the film is released from the endless belt support 11, the film is stretched in the film conveying direction (machine direction: MD direction) under a releasing tension and the subsequent conveying tension. Thus, the releasing tension and conveying tension exerted when the film is released from the endless belt support 11 are preferably set to 50 N/m to 400 N/m.

Furthermore, a residual solvent rate obtained when the film is released from the endless belt support 11 is preferably set to 30 mass % to 200 mass %, taking into account the ability to release the film from the endless belt support 11, the residual solvent rate measured during the release, the ability to convey the film after the release, the physical properties of the resin film resulting from conveyance and drying, and the like. The residual solvent rate is defined by:

$$\text{Residual solvent rate(mass \%)} = \{(M_1 - M_2)/M_2\} \times 100 \quad (1).$$

Here, $M_1$ denotes the mass of the film measured at any point of time, and $M_2$ denotes the mass of the film dried at 115° C. for 1 hour, with the mass $M_1$ of the film already measured.

The drying device 14 includes a plurality of conveying rollers. The film is dried by being conveyed between the rollers. During the conveyance, the film may be dried by using one of heated air, infrared light, and the like or using both heated air and infrared light. The heated air is preferably used in view of convenience. A drying temperature may be selected from the range of 30° C. to 180° C. as appropriate based on the residual solvent rate, taking the time required for drying, contraction unevenness, the stability of the amount of expansion and contraction, and the like into account, though the preferred temperature depends on the amount of residual solvent. Furthermore, the film may be dried at a constant temperature or at several levels of temperatures, that is, two to four levels of temperatures into which the range of temperatures is divided. Additionally, while being conveyed through the drying device 14, the film can be stretched in the MD direction.

The residual solvent rate of the film resulting from the drying process in the drying device 14 is preferably set to 0.001 mass % to 5 mass %, taking loads during the drying step, the dimensional stability and the ratio of expansion and contraction during storage, and the like into account. According to the present embodiment, the resin film refers to a film from which the solvent is gradually removed during the drying step, so that the total amount of residual solvent is 15 mass % or less.

The winding device 15 allows the resin film with the residual solvent rate set to a predetermined value by the drying device 14 to be wound around a winding core. During the winding, the temperature is preferably reduced to room temperature in order to prevent possible scratches, loose winding, and the like which are caused by contraction of the film after the winding. A winder used is not particularly limited but may be a common winder. Specifically, a winder to which a constant tension method, a constant torque method, a tapered tension method, a programmed tension control method with a constant internal stress, or the like is applied may be used for the winding.

The device for producing a resin film is not limited to the above-described configuration, and may include, for example, a separate stretching device. The stretching device may, for example, stretch the film released from the endless belt support 11 in a direction orthogonal to the film conveying direction (traverse direction: TD direction).

The composition of the resin solution (dope) for use in the present embodiment will be described.

The resin solution for use in the present embodiment is a transparent resin dissolved into a solvent.

The transparent resin may exhibit transparency when shaped like a substrate by the solution cast film-forming method or the like and is not particularly limited. However, preferably, for example, the transparent resin can be easily produced by the solution cast film-forming method or the like, can be bonded well to another functional layer such as a hard coat layer, and is optically isotropic. The transparency as used herein means that the transparent resin allows 60% or more, preferably 80% or more, and more preferably 90% or more of visible light to pass through.

Specifically, particularly preferred examples of the transparent resin include cellulose ester resins such as a cellulose diacetate resin, a cellulose triacetate resin, a cellulose acetate butyrate resin, and a cellulose acetate propionate resin; polyester resins such as a polyethylene terephthalate resin and a polyethylene naphthalate resin; an acrylic resin such as a polymethyl methacrylate resin; vinyl resins such as a polysulfone (including polyether sulfone) resin, a polyethylene resin, a polypropylene resin, cellophane, a polyvinylidene chloride resin, a polyvinyl alcohol resin, an ethylene vinyl alcohol resin, a syndiotactic polystyrene resin, a cycloolefin resin, and a polymethyl pentene resin; a polycarbonate resin; a polyarylate resin; a polyether ketone resin; a polyether ketone imide resin; a polyamide resin; and a fluorine resin. Among these resins, the cellulose ester resins, the cycloolefin resin, the polycarbonate resin, and the polysulfone (including polyether sulfone) resin are preferred. Moreover, the cellulose ester resins are preferred, and among the cellulose ester resins, the cellulose acetate resin, the cellulose propionate resin, the cellulose butyrate resin, the cellulose acetate butyrate resin, the cellulose acetate propionate resin, and the cellulose triacetate resin are preferred. The cellulose triacetate resin is particularly preferred. Furthermore, each of the illustrated transparent resins may be independently used or two or more of the illustrated transparent resins may be combined together.

Now, the cellulose ester resin will be described.

The cellulose ester resin preferably has a number average molecular weight of 30,000 to 200,000 in order to offer a high mechanical strength when the resin is formed into a resin film and to offer an appropriate dope viscosity for the solution cast film-forming method. Furthermore, the cellulose ester resin preferably has a weight average molecular weight (Mw)/number average molecular weight (Mn) between 1 and 5 and more preferably between 1.4 and 3.0.

Furthermore, the average molecular weight and molecular weight distribution of the resin such as the cellulose ester resin can be measured using gel permeation chromatography or high-speed liquid chromatography. Hence, the average molecular weight and the molecular weight distribution can be used to calculate the number average molecular weight (Mn) and the weight average molecular weight (Mw), and the ratio between the number average molecular weight (Mn) and the weight average molecular weight (Mw) can be calculated.

The cellulose ester resin preferably has an acyl group with a carbon number of 2 to 4 as a substituent group. For example, when the acyl group is defined to have substitution degree X for an acetyl group and a substitution degree Y for a propionyl group or a butyryl group, preferably the sum of X and Y is 2.2 or more and 2.95 or less, and X is more than 0 and equal to or less than 2.95.

Furthermore, a portion of the cellulose ester resin which has not been substituted with the acyl group is normally present as a hydroxyl group. The cellulose ester resins can be synthesized by a well-known method. The substation degree of the acyl group can be measured in conformity with the provision in ASTM-D817-96.

Cellulose, which is a material for the cellulose ester resin, is not particularly limited. Examples of the cellulose include cotton linter, wood pulp (obtained from needle-leaved trees or broad-leaved trees), and Kenaf. Furthermore, cellulose ester resins obtained from these materials may be blended together in any ratio. However, 50 mass % or more cotton linter is preferably used. If an acylating agent is an acid anhydride (acetic anhydride, propionic anhydride, or butyric anhydride), these cellulose ester resins can be obtained by reaction with the cellulose material using an organic acid such as acetic acid or an organic solvent such as methylene chloride as well as a proton catalyst such as sulfuric acid.

The solvent for use in the present embodiment may contain a good solvent for the above-described transparent resins. The good solvent used depends on the transparent resin used. For example, in the case of the cellulose ester resin, whether the solvent is good or poor is determined depending on the acyl group substation degree of the cellulose ester. For example, when acetone is used as a solvent, the solvent is good for cellulose acetate propionate, which is an ester acetate of the cellulose ester (a substation degree of 2.4 for the acetyl group) and is poor for the ester acetate of the cellulose (a substation degree of 2.8 for the acetyl group). Thus, since whether a solvent is good or poor is determined depending on the transparent resin used, a case of the cellulose ester resin will be described by way of example.

Examples of the good solvent for the cellulose ester resin include an organic halogen compound such as methylene chloride, methyl acetate, ethyl acetate, amyl acetate, acetone, tetrahydrofuran, 1,3-dioxolane, 1,4-dioxolane, a dioxolane derivative, cyclohexane, ethyl formate, 2,2,2-trifluoroethanol, 2,2,3,3-tetrafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, and nitroethane. Among these solvents, the organic halogen compound such as methylene chloride, the dioxolane derivative, methyl acetate, ethyl acetate, acetone, and the like are preferred. Each of these good solvents may be independently used, or two or more of the good solvents may be combined together.

Furthermore, the dope may contain a poor solvent to the extent that the transparent resin is prevented from being precipitated. Examples of the poor solvent for the cellulose ester resin include alcohols with 1 to 8 carbon atoms such as methanol, ethanol, n-propanol, iso-propanol, n-butanol, sec-butanol, and tert-butanol, methyl ethyl ketone, methyl isobutyl ketone, propyl acetate, monochlorobenzene, benzene, cyclohexane, tetrahydrofuran, methyl cellosolve, and ethylene glycol monomethyl ether. Each of these poor solvents may be independently used, or two or more of the poor solvents may be combined together.

Additionally, the resin solution for use in the present embodiment may contain any component (additive) different from the above-described transparent resins and solvents to the extent that the effects of the present invention are prevented from being hindered. Examples of the additive include particulates, a plasticizer, an antioxidant, an ultraviolet absorber, a heat stabilizer, a conductive substance, a flame retardant, a glidant, and a matting agent.

The particulates are selected as appropriate according to an intended purpose. Specifically, the intended purpose is, for example, to scatter visible light or provide a slippage property to the transparent resin by containing the particulates in the transparent resin. When the transparent resin contains the particulates, both the scattering of visible light and the improvement of the slippage property can be achieved. Furthermore, for either intended purpose, the particle size of the particulates and the content of particles need to be adjusted to the extent that the transparency of the film is prevented from being impaired. The particulates may be inorganic particulates such as silicon oxide or organic particulates such as acrylic resin.

Examples of the inorganic particulates include particulates of silicon oxide, titanium oxide, aluminum oxide, zirconium oxide, magnesium oxide, calcium carbonate, strontium carbonate, talc, clay, calcined kaolin, calcined calcium silicate, hydrated calcium silicate, aluminum silicate, magnesium silicate, and calcium phosphate. Among these particulates, particulates of silicon oxide, titanium oxide, aluminum oxide, zirconium oxide, magnesium oxide, and the like are preferably used.

Furthermore, examples of the organic particles include particles of an acrylic resin such as a polymethyl methacrylate resin, and an acryl styrene resin, a silicone resin, a polystyrene resin, a polycarbonate resin, a benzoguanamin resin, a melamine resin, a polyolefin resin, a polyester resin, a polyamide resin, a polyimide resin, and a polyfluoroethylene resin. Among these particulates, for example, acrylic resin particulates of cross-linked polystyrene particles and polymethyl methacrylate particles are preferred.

Furthermore, each of the above-described types of particulates may be independently used or two or more of these types of particulates may be combined together.

The particulates preferably have an average particle size of 0.1 μm to 10 μm and more preferably 0.3 μm to 5 μm. Particulates having an excessively small average particle size tend to fail to sufficiently provide the functions thereof. Furthermore, particulates having an excessively large average particle size tend not only to fail to sufficiently provide the functions thereof but also to degrade the translucency of the resin film. The average particle size of the particulates can be measured by observing a cross section of the resin film with a TEM but may be measured using a laser diffraction particle size distribution analyzer.

The content of particulates is preferably 0.01 mass % to 35 mass % and more preferably 0.05 mass % to 30 mass % of the transparent resin. An excessively small particulate content prevent the functions of the particulates from being sufficiently provided. Furthermore, an excessively large particulate content tends to degrade the translucency of the resin film.

Furthermore, the shape of the particulates is not particularly limited. Examples of the shape include a sphere, a plate, and a needle shape. The sphere is preferred.

The plasticizer may be used without any particular limitation. Examples of the plasticizer include a phosphate plasticizer, a phthalate plasticizer, a trimellitate plasticizer, a pyromellitic plasticizer, a glycolate plasticizer, a citrate plasticizer, and a polyester plasticizer. When the transparent resin contains the plasticizer, the content of the plasticizer is preferably set to 1 mass % to 40 mass %, more preferably 3 mass % to 20 mass %, and much more preferably 4 mass % to 15 mass % of the cellulose ester resin taking dimensional stability and workability into account. An excessively small plasticizer content may preclude smooth cut surfaces of the transparent resin from being obtained during slitting or punching. This tends to generate a large amount of chips. That is, the effect of containing the plasticizer in the transparent resin cannot be sufficiently exerted.

The antioxidant may be used without any particular limitation. For example, a hindered phenol compound is preferably used. Furthermore, if the transparent resin contains the antioxidant, the content of the antioxidant in terms of percentage by mass is preferably 1 ppm to 1.0% and more preferably 10 ppm to 1,000 ppm of the cellulose ester resin.

The resin film produced by the producing method according to the present embodiment can be used for a polarizing plate, a liquid crystal display member, or the like owing to the high dimensional stability thereof. In this case, an ultraviolet absorber is preferably used to prevent the polarizing plate, the liquid crystal, or the like from being degraded.

A preferred ultraviolet absorber is excellent in absorbing ultraviolet light with a wavelength of 370 nm or less, and absorbs a reduced amount of visible light with a wavelength of 400 nm or more so as to provide appropriate liquid crystal display performance. Specifically, the ultraviolet absorber preferably allows less than 10% and particularly preferably less than 5% of light with a wavelength of 380 nm to pass through. Specifically, examples of the ultraviolet absorber include an oxybenzophenone compound, a benzotriazole compound (benzotriazole ultraviolet absorber), a salicylate compound, a benzophenone compound (benzophenone ultraviolet absorber), a cyanoacrylate compound, a nickel complex salt compound, and a triazine compound. Among these ultraviolet absorbers, the benzotriazole ultraviolet absorber and the benzophenone ultraviolet absorber are preferred. The content of the ultraviolet absorber is preferably set to 0.1 mass % to 2.5 mass % and more preferably 0.8 mass % to 2.0 mass % taking the effects of the ultraviolet absorber, transparency, and the like into account.

Examples of the heat stabilizer include inorganic particulates such as kaolin, talc, diatomite, quartz, calcium carbonate, barium sulfate, titanium oxide, and alumina, and salts of alkali earth metal such as calcium and magnesium.

The conductive substance is not particularly limited. Examples of the conductive substance include ion conductive substances such as an anionic polymer compound, conductive particulates such as particulates of metallic oxide, and an antistatic agent. When the transparent resin contains the conductive substance, a resin film with a preferred impedance can be obtained. Here, the ion conductive substance refers to a substance exhibiting electric conductivity and containing ions that are carriers for electricity.

It is preferable that the dope has the viscosity of 30 Pa·s to 80 Pa·s as measured at 30° C. using a rotational viscometer. Due to this, a resin film can be efficiently produced while suppressing the formation of membranes derived from the resin solution used for production of the resin film on the outer surface of the casting die 20. The use of such a dope with a relatively high viscosity allows a resin film to be efficiently produced but generally tends to cause the formation of membranes derived from the resin solution used for production of the resin film on the outer surface of the casting die 20. However, the method for producing a resin film according to the present embodiment can improve the production efficiency of a resin film while suppressing the formation of the membranes. The viscosity as used herein is not particularly limited provided that the viscosity is measured at 30° C. using a rotational viscometer. Specifically, the viscosity is measured as follows, for example. First, the dope flowing through the dope feeding pipe 22 in the casting die 20 is drawn into a closed container for containment. Then a spindle of a rotational viscometer (B type viscometer) produced by Brookfield Engineering Laboratories, Inc. is inserted into the dope in the closed container and rotated at a shear velocity of 0.5 (1/s) to obtain a value.

Now, an example of a method for preparing dope will be described in which a cellulose ester resin is used as a transparent resin.

A method for dissolving a cellulose ester resin during preparation of dope is not particularly limited, and any common method may be used. A preferred method is as follows. A combination of heating and pressurization enables heating up to a temperature equal to or higher than the boiling point of a solvent at normal pressure. This is utilized to allow the cellulose ester resin to be dissolved into the solvent at a temperature equal to or higher than the boiling point of the solvent at normal pressure. This method is preferred in that the method prevents generation of gel or a massive undissolved substance called "mamako" (lump). A method is also preferably used in which the cellulose ester resin is blended with a poor solvent and thus wetted or swollen and in which a good solvent is added to the cellulose ester resin to dissolve the cellulose ester resin.

The pressurization may be carried out by a method of feeding inert gas such as nitrogen gas under pressure or heating the solvent in the closed container to raise the vapor pressure of the solvent. This heating is preferably externally carried out, and for example, a container of a jacket type is preferred because the temperature of the container can be easily controlled.

The temperature (heating temperature) of the solvent used when the cellulose ester resin is dissolved is preferably high because a high temperature allows facilitates the dissolution of the cellulose ester resin. However, increasing the heating temperature requires an increase in the pressure in the container by the above-described pressurization, thus degrading productivity. Hence, the heating temperature is preferably 45° C. to 120° C. Furthermore, the pressure is adjusted to a value such that the solvent is prevented from being boiled at the set temperature. Alternatively, a cooling dissolution method is preferably used and allows the cellulose ester resin to be dissolved into a solvent such as methyl acetate.

Then, the obtained solution of the cellulose ester resin is filtered using an appropriate filter medium such as filter paper. The filter medium preferably has a low absolute filter rating so as to remove insoluble substances and the like. However, an excessively low absolute filter rating is disadvantageously likely to cause the filter medium to be clogged. Thus, the filter medium preferably has an absolute filter rating of 0.008 mm or less and more preferably 0.001 mm to 0.008 mm.

The material of the filter medium is not particularly limited, and any ordinary filter medium may be used. For example, the following filter medium is preferred because the filter medium is free from coming-off of fiber and the like: a filter medium formed of plastic such as polypropylene or Teflon (registered trademark), filter paper formed of cellulose fiber or rayon, or a filter medium formed of metal such as stainless steel. The filtration preferably allows impurities, particularly, bright-spot foreign matter contained in the solution of the cellulose ester resin, which is a material, to be removed and reduced. The bright-spot foreign matter is as follows. Two polarizing plates are disposed in a crossed Nichol state, with a resin film interposed between the plates. One of the polarizing plates is lighted from a first side, and an observer views the other polarizing plate from a second side opposite to the first side. Then, the observer views gleam of light from the first side. These spots (foreign matter) where the light is visible are referred to as the bright-spot foreign matter. Preferably, 200 or less bright spots each with a diameter of 0.01 mm or more are present per $cm^2$.

The filtration is not particularly limited and can be carried by a normal method. A preferred method is to carry out filtration while heating the solvent within the range of temperatures which are equal to or higher than the boiling point of the solvent at normal pressure and at which the solvent is prevented from being boiled under pressure. This method is preferred because the method suppresses an increase in the difference between the filter pressure before the filtration and the filter pressure after the filtration (the difference is referred to as a differential pressure). The above-described temperature is preferably 35° C. to 60° C. The level of the filtration is preferably low, for example, 1.6 MPa or less.

If the above-described additive is contained in the resin film, then for example, the additive may be dissolved into an organic solvent such as alcohol, methylene chloride, or dioxolane before the resultant solvent is added to the dope or may be added directly into a dope composition. Furthermore, for inorganic powder or the like which is not dissolved into an organic solvent, preferably a dissolver or a sand mill is used to disperse the additive into the cellulose ester resin and the resultant dispersion liquid is added to the dope.

The particulates are dispersed into the obtained solution of the cellulose ester resin. A method for dispersing the particulates is not particularly limited and can be carried out, for example, as follows. For example, first, a dispersion solvent and the particulates are stirred and mixed and then dispersed using a disperser. A particulate dispersion liquid is obtained. The particulate dispersion liquid is added to the above-described solution of the cellulose ester resin, which is then stirred.

Examples of the dispersion solvent include lower alcohols such as methyl alcohol, ethyl alcohol, propyl alcohol, isopropyl alcohol, and butyl alcohol. The dispersion solvent is not particularly limited to the lower alcohols. A solvent is preferably used which is similar to the solvent used to prepare the solution of the cellulose ester resin.

The disperser used is not particularly limited, and a common disperser may be used. The disperser is roughly classified into a media type and a media-less type. The media-less disperser is preferred due to the reduced haze thereof (increased translucency). Examples of the media-less disperser include a ball mill, a sand mill, and a dyno mill. Furthermore, the media-less disperser is classified into an ultrasonic type, a centrifugal type, and a high-pressure type, and the high-pressure disperser is preferred. The high-pressure disperser is an apparatus that mixes the particulates and a solvent to obtain a composition and to pass the composition through a small tube to generate a special condition such as a high shear condition or a high-pressure condition. Examples of the high-pressure disperser include an ultrahigh-pressure homogenizer produced by Microfluidics Corporation (trade name: Microfluidizer), a nanomizer produced by Nanomizer Inc., and a Manton Gorlin high-pressure disperser. Examples of the Manton Gorlin high-pressure disperser include a homogenizer produced by Izumi Food Machinery Co., Ltd. and UHN-01 produced by Sanwa Machinery Trading Co., Ltd.

Furthermore, the solvent flowing from the both ends of the discharge port in the casting die may be similar to the solvent for the resin solution (dope). Specifically, the solvent may contain a good solvent for the transparent resin and may contain a poor solvent as appropriate.

According to the method for producing according to the present embodiment as described above, a resin film can be produced while suppressing the formation of membranes derived from a resin solution used for production of the resin film.

The resin film produced by the producing method according to the present embodiment thus is a resin film which has fewer troubles such as dot troubles caused by scattered anti-solidification liquid for suppression of generation of membranes on the outer surface of the casting die upon production. Further, the obtained resin film has excellent optical properties with high uniformity in terms of retardation or orientation because disturbance of the flow of the resin solution (dope) can be suppressed which may be otherwise caused by membranes formed on the outer surface around the discharge port of the casting die.

Furthermore, the width of the resin film obtained is preferably set to 1,500 mm to 4,000 mm taking into account the use of the resin film in a large-sized liquid crystal display device, the use efficiency of the film for processing into a polarizing plate, and production efficiency. When such a wide resin film is produced, membranes derived from the resin solution used for production of the resin film tend to be generally formed on the outer surface of the casting die 20. However, the method for producing a resin film according to the present embodiment can provide a resin film while suppressing the formation of the membranes.

Furthermore, the film thickness of the resin film is preferably set to 20 μm to 70 μm in view of reduced thickness of the liquid crystal display device and stabilized production of resin films. The film thickness as used herein refers to the average film thickness. A contact thickness gauge produced by Mitsutoyo Corporation is used to measure the film thickness of the resin film at 20 points to 200 points in the width direction thereof. The measured values are averaged to determine the film thickness.

(Polarizing Plate)

The polarizing plate according to the present embodiment includes a polarizing element and a transparent protective film disposed on a surface of the polarizing element. The transparent protective film is the above-described resin film. The polarizing element is an optical element that converts incident light into polarized light and emits the polarized light.

The polarizing plate preferably includes a polarizing element produced by immersing a polyvinyl alcohol film into an iodine solution and then stretching the film, and the above-described resin film or laminated film stuck to at least one surface of the polarizing element using a completely saponified water solution of polyvinyl alcohol. Alternatively, the resin film may be laminated on another surface of the polarizing element, or a transparent protective film for another polarizing plate may be laminated on the polarizing element. Preferred examples of the transparent protective film for the polarizing plate include commercially available cellulose ester films such as KC8UX2M, KC4UX, KC5UX, KC4UY, KC8UY, KC12UR, KC8UY-HA, and KC8UX-RHA (all of these films are produced by Konica Minolta Optics, Inc.). Alternatively, a resin film other than the cellulose ester film such as a cyclic olefin resin, an acrylic resin, polyester, and polycarbonate may be used. Such a resin film has low saponification compatibility and is thus preferably bonded to the polarizing plate via an appropriate adhesive.

As described above, the polarizing plate uses the resin film as a protective film laminated on at least one surface of the polarizing element. In this case, if the resin film functions as a phase difference film, a slow axis of the resin film is preferably disposed substantially parallel or orthogonally to an absorption axis of the resin film.

Furthermore, a specific example of the polarizing element is a polyvinyl alcohol polarizing film. One type of polyvinyl alcohol polarizing film is a polyvinyl alcohol film dyed with iodine, and another type of polyvinyl alcohol polarizing film is a polyvinyl alcohol film dyed with a dichroic dye. As this polyvinyl alcohol film, a modified polyvinyl alcohol film modified with ethylene is preferably used.

The polarizing element is obtained, for example, as follows. First, a water solution of polyvinyl alcohol is used to produce a film. The polyvinyl alcohol film obtained is uniaxially stretched and then dyed or dyed and then uniaxially stretched. Then, the film is preferably subjected to a durability treatment using a boron compound.

The polarizing element is preferably 5 µm to 40 µm, more preferably 5 µm to 30 µm, and most preferably 5 µm to 20 µm in film thickness.

If a cellulose ester resin film is laminated on a surface of the polarizing element, the lamination is preferably carried out using an aqueous adhesive containing completely saponified polyvinyl alcohol or the like as a main component. Furthermore, if the resin film is other than the cellulose ester resin film, the resin film is preferably bonded to the polarizing plate via an appropriate viscous layer.

The above-described polarizing plate uses the resin film according to the present embodiment as a transparent protective film. Because the resin film has fewer troubles such as dot troubles caused by scattered anti-solidification liquid for suppression of generation of membranes on the outer surface of the casting die upon production and has excellent optical properties with high uniformity in terms of retardation or orientation, the obtained polarizing plate can realize, when it is applied to liquid crystal display devices, for example, high image quality in the liquid crystal display devices.

(Liquid Crystal Display Device)

A liquid crystal display device according to the present embodiment includes a liquid crystal cell and two polarizing plates arranged so as to sandwich the liquid crystal cell therebetween. At least one of the two polarizing plates is the above-described polarizing plate. The liquid crystal cell refers to a pair of electrodes between which a liquid crystal substance is filled. Application of a voltage to the electrodes changes the orientation state of the liquid crystal, thus controlling the amount of light transmitted. Such a liquid crystal display device uses the above-described polarizing plate as a transparent protective film for a polarizing plate. Hence, a liquid crystal display device is obtained which provides improved image quality, that is, improved contrast or the like.

EXAMPLES

The present invention will be specifically described below with reference to examples. However, the present invention is not limited to these examples.

Example 1

Preparation of Dope

First, 100 parts by mass cellulose triacetate resin (number average molecular weight Mn: 148,000, weight average molecular weight Mw: 310,000, Mw/Mn=2.1) as a transparent resin was added into a solution tank containing 440 parts by mass methylene chloride and 40 parts by mass ethanol, and 8 parts by mass triphenyl phosphate, 2 parts by mass ethylphthalyl ethylglycol, 0.5 parts by mass TINUVIN 109 (produced by BASF Japan Ltd.), 0.5 parts by mass TINUVIN 171 (produced by BASF Japan Ltd.), and 0.2 parts by mass AEROSIL 972V (produced by Nippon Aerosil Co., Ltd.) were further added into the tank. Then, the temperature of the liquid in the tank was increased up to 80° C., and the liquid was stirred for 3 hours. Thus, a resin solution was obtained. Subsequently, the stirring was ended, and the solution was left untreated until the temperature decreased down to 43° C. After being left untreated, the resin solution was filtered using filter paper with a filtration accuracy of 0.005 mm. After the filtration, the resin solution was left untreated overnight to degas the resin solution. The resultant resin solution was used as dope to produce a resin film as described below.

(Production of Resin Film)

First, the temperature of the dope obtained was adjusted to 30° C., and the temperature of an endless belt support was adjusted to 25° C. Then, such a device for producing a resin film as shown in FIG. 1 was used to cast the dope conveyed at a speed of 100 m/min, from a casting die onto the endless belt support, including an endless belt formed of stainless steel and polished into a super mirror surface.

The casting die used was as follows.

The casting die had the width in a longitudinal direction of 2,500 mm and had a fluororesin coating layer at the central portion for 2,490 mm of the lower end of the outer surface, which was a coating of a fluororesin, Cytop, produced by Asahi Glass Co., Ltd. The fluororesin coating layer had the thickness of 5 µm. The fluororesin coating layer had the width B of 50 mm. The casting dye had on both ends of the outer surface roughened layers which were prepared by roughening treatment with a sandpaper. The roughened layer had the width A of 1 mm and the length C of 5 mm. The width A of the roughened layer is shown in Table 1.

The surface roughness Rz of the roughened layer is shown in Table 1, which was 800 nm. Rz in this context was measured according to the method of JIS B0601: 2001 with SJ-400 from Mitutoyo Corporation.

The roughened layer had the surface energy higher than that of the fluororesin coating layer for the difference shown in Table 1.

The difference in surface energy shown in Table 1 is the difference between the average of the surface energy measured at intervals of 10 mm over a range of 300 mm from the longitudinally opposite ends of the slit portion and the surface energy in the fluororesin coating layer. Furthermore, the surface energy was measured by the above-described method.

When the dope is cast, a solvent which was a mixed solvent of 95 mass % of methylene chloride and 5 mass % of methanol was allowed to flow from a solvent feeding port on the roughened layer so as to finally fall from both ends of a discharge port of the casting die.

Then, air at 40° C. was fed by a dryer disposed on the endless belt support side at 10 m/min to dry a web on the endless belt support. The dried web was released from the endless belt support to obtain a film. Immediately before the release, the film had a residual solvent rate of 80 mass %.

The released film was dried at 80° C. for 1 hour while being conveyed by a conveying roller. A stretching device (tenter) was used in an environment of 100° C. to stretch the dried film in a TD direction at a stretching ratio of 1.25 with the opposite ends of the film gripped by clips. During the stretching, the film had a residual solvent rate of 3 mass % to 10 mass %. The stretched film was dried at 125° C. for 1 hour while being conveyed by the conveying roller.

Subsequently, the dried film was wound around a winding device to obtain a resin film wound in a roll. The resin film obtained was cooled down to 20° C.

The resin film thus obtained was a cellulose ester film of 50 μm in film thickness and 2,200 mm in width.

Example 2

The same procedures as Example 1 are carried out except that the width A of the roughened layer is 3 mm as shown in Table 1 and the roughness of a sandpaper used for roughening treatment is changed so as to obtain the surface roughness Rz of the roughened layer of 1,000 nm as shown in Table 1.

Example 3

The same procedures as Example 1 are carried out except that the width A of the roughened layer is 8 mm as shown in Table 1 and the roughness of a sandpaper used for roughening treatment is changed so as to obtain the surface roughness Rz of the roughened layer of 2,500 nm as shown in Table 1.

Example 4

The same procedures as Example 1 are carried out except that the width A of the roughened layer is 10 mm as shown in Table 1 and the roughness of a sandpaper used for roughening treatment is changed so as to obtain the surface roughness Rz of the roughened layer of 8,000 nm as shown in Table 1.

Example 5

The same procedures as Example 1 are carried out except that the width A of the roughened layer is 10 mm as shown in Table 1 and the roughness of a sandpaper used for roughening treatment is changed so as to obtain the surface roughness Rz of the roughened layer of 8,500 nm as shown in Table 1.

Examples 6 to 10

The same procedures as Examples 1 to 5 are carried out in Examples 6 to 10 except that the thickness of the fluororesin coating layer is changed to 3 mm so as to obtain the difference in surface energy of 10 mN/m.

Comparative Example 1

The same procedures as Example 1 are carried out except that the roughened layer is not formed.

Comparative Example 2

The same procedures as Comparative Example 1 are carried out except that the width A of the roughened layer is 12 mm as shown in Table 1 and the surface roughness Rz of the roughened layer is 2,500 nm as shown in Table 1.

Comparative Example 3

The same procedures as Example 1 are carried out except that the width A of the roughened layer is 0 mm as shown in Table 1, the surface roughness Rz at the position 5 mm from the end (the region where the roughened layer exists in Examples) is 800 nm as shown in Table 1 and the thickness of the fluororesin coating layer is changed so as to obtain the difference in surface energy of 40 mN/m.

Comparative Example 4

The same procedures as Example 1 are carried out except that the width A of the roughened layer is 12 mm as shown in Table 1, the surface roughness Rz of the roughened layer is 2,500 nm as shown in Table 1 and the thickness of the fluororesin coating layer is changed so as to obtain the difference in surface energy of 40 mN/m.

Resin films obtained as described above (Examples 1 to 10 and Comparative Examples 1 to 4) were evaluated as follows, with the results of the evaluation shown in Table 1.

(Formation of Membranes)

It was observed whether or not membranes were formed on the outer surface of the casting die during formation of the resin films as described above. Specifically, the edges of the cast membranes on the support were observed by a camera and it was determined that the membranes were formed when the flow of the dope was disturbed.

The score "ⓧ" was given when formation of membranes were not observed after successive productions of resin films over 4 weeks or more. The score "O" was given when formation of membranes were not observed after successive productions of resin films over 2 weeks or more but formation of membranes were observed after successive productions of resin films for 4 weeks and the score "x" was given when formation of membranes were observed after successive productions of resin films for 2 weeks.

(Dot Troubles)

The surface of the formed resin films were visually inspected for the presence or absence of a circular dent. The dent is assumed to be a dot trouble resulting from a scattered solvent.

The score "⊚" was given when no circular dent was observed after successive productions of resin films over a month or more. The score "○" was given when no circular dent was observed after successive productions of resin films over 2 weeks or more but a circular dent was observed after successive productions of resin films for 4 weeks and the score "Δ" was given when no circular dent was observed after successive productions of resin films over 3 days or more but a circular dent was observed after successive productions of resin films for 2 weeks. The score "x" was given when a circular dent was observed after successive productions of resin films for 3 days.

The results are shown in Table 1.

TABLE 1

|  | Difference in surface energy (mN/m) | Surface roughness Rz (nm) | Width A (mm) | Formation of membranes | Dot troubles |
|---|---|---|---|---|---|
| Example 1 | 30 | 800 | 1 | ○ | ○ |
| Example 2 | 30 | 1000 | 3 | ⊚ | ⊚ |
| Example 3 | 30 | 2500 | 8 | ⊚ | ⊚ |
| Example 4 | 30 | 8000 | 10 | ⊚ | ⊚ |
| Example 5 | 30 | 8500 | 10 | ○ | ⊚ |
| Example 6 | 10 | 800 | 1 | ○ | ○ |
| Example 7 | 10 | 1000 | 3 | ⊚ | ⊚ |
| Example 8 | 10 | 2500 | 8 | ⊚ | ⊚ |
| Example 9 | 10 | 8000 | 10 | ⊚ | ⊚ |
| Example 10 | 10 | 8500 | 10 | ○ | ⊚ |
| Comparative Example 1 | 0 | 800 | 0 | x | x |
| Comparative Example 2 | 0 | 2500 | 12 | x | x |
| Comparative Example 3 | 40 | 800 | 0 | x | x |
| Comparative Example 4 | 40 | 2500 | 12 | x | x |

As can be seen from Table 1, when the casting dies (Examples 1 to 10) were used which have the surface energy of the roughened layer (first region) of 10 mN/m to 30 mN/m higher than the surface energy of the fluororesin coating layer (second region), formation of membranes was suppressed and dot troubles were fewer compared to the cases where the casting dies were used which have no difference in the surface energy (Comparative Examples 1 and 2) and which have the surface energy of the roughened layer (first region) of over 30 mN/m higher than the surface energy of the fluororesin coating layer (second region) (Comparative Examples 3 and 4).

The Description discloses various aspects of techniques as described above. Several main techniques will be described below.

An aspect of the present invention is a method for producing a resin film, including a casting step of casting a resin solution containing a transparent resin from a casting die onto a running support to form a cast membrane; and a releasing step of releasing the cast membrane from the support, wherein, in the casting step, the resin solution is discharged from a discharge port of the casting die to cast the resin solution onto the support while a solvent capable of dissolving the transparent resin is flowed on an outer surface of the casting die from the positions above longitudinally opposite ends of the discharge port of the casting die toward the longitudinally opposite ends of the discharge port of the casting die, so that the solvent falls from the longitudinally opposite ends of the discharge port of the casting die; and the casting die has a surface energy of a first region which is 10 mN/m to 30 mN/m higher than a surface energy of a second region, the first region being the region, on the outer surface of the casting die, surrounded by the positions above the longitudinally opposite ends of the discharge port of the casting die and the longitudinally opposite ends of the discharge port of the casting die, and the second region being a region which is closer to a longitudinally central portion of the discharge port of the casting die than the first region.

According to the above configurations, the method for producing a resin film can be provided in which formation of membranes derived from the resin solution used for production of the resin film on the outer surface of the casting die is suppressed.

The method is expected to be provided for the following reasons.

First, by allowing the solvent (anti-solidification liquid) capable of dissolving the transparent resin to be contained in the resin film to fall from longitudinally opposite ends of the discharge port of the casting die, at least a part of the anti-solidification liquid penetrates into the cast membrane on the support and the solvent concentration at the edges in the width direction of the cast membrane (the direction orthogonal to the conveying direction of the cast membrane) may be increased. Therefore, even if the edges of the cast membrane cast from the casting die tend to be dried faster than other parts, formation of membranes on the outer surface around longitudinally opposite ends of the discharge port of the casting die may be suppressed.

Next, the fact that the first region has higher surface energy than the second region may indicate that the first region has lower liquid repellent property than the second region. Due to this, the anti-solidification liquid may flow relatively slowly on the first region. Thus the anti-solidification liquid may be prevented from scattering from the first region to the second region or the dope may be prevented from skewing in the first region. This may cause suitable fall of the anti-solidification liquid at positions in the width direction of the dope discharged from the discharge port. As a result, generation of troubles such as dot troubles on the resulting resin film due to scattered anti-solidification liquid in regions other than the first region can be suppressed while formation of membranes on the outer surface around longitudinally opposite ends of the discharge port of the casting die can be suppressed.

Further, the fact that the second region has lower surface energy than the first region may indicate that the first region has lower liquid repellent property than the second region. Due to this, even when the resin solution (dope) is adhered to the second region, it slips off therefrom to suppress formation of membranes which may be otherwise formed when the adhered dope is dried. As a result, formation of membranes on the outer surface around longitudinally opposite ends of the discharge port of the casting die may be suppressed.

Accordingly, formation of membranes derived from the resin solution used for production of the resin film on the outer surface of the casting die may be suppressed. In addition, as described above, generation of troubles such as dot troubles on the resulting resin film caused by scattered anti-solidification liquid may also be suppressed.

In the method for producing a resin film, it is preferred that the first region has the surface roughness as ten-point height of irregularities Rz of 1,000 nm to 8,000 nm.

According to the above configurations, the method for producing a resin film can be provided in which formation of membranes derived from the resin solution used for production of the resin film on the outer surface of the casting die is further suppressed.

The method is expected to be provided for the following reason.

In addition to what described above, by selecting the surface roughness of the first region within the above range, scattering of the anti-solidification liquid from the first region to the second region and skewing of the dope in the first region may be further suppressed. This may cause suitable fall of the anti-solidification liquid at positions in the width direction of the dope discharged from the discharge port. As a result, generation of troubles such as dot troubles on the resulting resin film due to scattered anti-solidification liquid in regions other than the first region can be further suppressed while formation of membranes on the outer surface around longitudinally opposite ends of the discharge port of the casting die can be further suppressed.

In the method for producing a resin film, it is preferred that the first region has a length in a direction parallel to the longitudinal direction of the discharge port of 1 mm to 10 mm, more preferably 3 mm to 10 mm.

According to the above configurations, the method for producing a resin film can be provided in which formation of membranes derived from the resin solution used for production of the resin film on the outer surface of the casting die is further suppressed. The reason for this may be as follows: by selecting the length in the direction parallel to the longitudinal direction of the discharge port of the first region within the above range, the effect of suppressing formation of membranes on the outer surface around longitudinally opposite ends of the discharge port of the casting die and the effect of suppressing formation of membranes on the outer surface around the longitudinally central portion of the discharge port of the casting die may both suitably be provided.

In the method for producing a resin film, it is preferred that the transparent resin is a cellulose ester resin, and the solvent contains methylene chloride.

According to the above configurations, the method for producing a resin film can be provided in which formation of membranes derived from the resin solution used for production of the resin film on the outer surface of the casting die is further suppressed. The reason for this may be as follows: the solvent containing methylene chloride can suitably dissolve the cellulose ester resin. Thus by using the solvent containing methylene chloride as the solvent when the transparent resin is the cellulose ester resin, the solvent of the dope can be suitably prevented from being dried at longitudinally opposite ends of the discharge port and the resin film can be produced while suppressing formation of membranes derived from the resin solution. The obtained resin film may have increased light permeability because the transparent resin used is the cellulose ester resin.

Another aspect of the present invention is a casting die for casting a resin solution containing a transparent resin onto a running support to form a cast membrane, the casting die including, on the outer surface of the casting die and above longitudinally opposite ends of a discharge port, feeding ports for supplying a solvent capable of dissolving the transparent resin, wherein a surface energy of a first region which is surrounded by the feeding ports and the longitudinally opposite ends of the discharge port of the casting die is 10 mN/m to 30 mN/m higher than a surface energy of a second region which is closer to a longitudinally central portion of the discharge port of the casting die than the first region.

By producing a resin film using the casting die having such configurations, the resin film can be produced while suppressing formation of membranes derived from the resin solution used for production of the resin film on the outer surface of the casting die.

Another aspect of the present invention is a device for producing a resin film, including a support that is able to run, a casting die for casting a resin solution containing a transparent resin onto the running support to form a cast membrane on the support, and a releasing portion that releases the cast membrane from the support, wherein the casting die is the above-described casting die.

According to the above configurations, the device for producing a resin film can be provided which allows production of the resin film while suppressing formation of membranes derived from the resin solution used for production of the resin film on the outer surface of the casting die.

Another aspect of the present invention is a resin film obtained by the method for producing a resin film described above.

According to the above configurations, a resin film can be obtained which has fewer troubles such as dot troubles caused by scattered anti-solidification liquid for suppressing formation of membranes on the outer surface of the casting die upon production. Further, because disturbance of the flow of the resin solution (dope) due to membranes formed on the outer surface around the discharge port of the casting die can be suppressed, the obtained resin film has excellent optical properties with high uniformity in terms of retardation or orientation.

Another aspect of the present invention is a polarizing plate including a polarizing element and a transparent protective film disposed on a surface of the polarizing element, wherein the transparent protective film is the above-described resin film.

According to the above configurations, because the transparent protective film of the polarizing element is the resin film which has fewer troubles such as dot troubles caused by scattered anti-solidification liquid for suppressing formation of membranes on the outer surface of the casting die upon production and has excellent optical properties with high uniformity in terms of retardation or orientation, the polarizing plate can be obtained which can realize, when it is used, for example, for liquid crystal display devices, high image quality.

Another aspect of the present invention is a liquid crystal display device including a liquid crystal cell and two polarizing plates disposed to sandwich the liquid crystal cell therebetween, wherein at least one of the two polarizing plates is the above-described polarizing plate.

According to the above configurations, because the polarizing plate is used which comprises the resin film which has fewer troubles such as dot troubles caused by scattered anti-solidification liquid for suppressing formation of membranes on the outer surface of the casting die upon production and has excellent optical properties with high uniformity in terms of retardation or orientation, the liquid crystal device having high image quality can be obtained.

INDUSTRIAL APPLICABILITY

According to the present invention, a method for producing a resin film can be provided in which formation of membranes derived from a resin solution used for production of the resin film on the outer surface of a casting die is suppressed. The present invention also provides a casting die for use in the producing method, a device for producing a resin film which device includes the casting die, a resin film obtained by the producing method, a polarizing plate including the resin film used as a transparent protective film, and a liquid crystal display device including the polarizing plate.

The invention claimed is:

1. A method for producing a resin film, comprising:
   a casting step of casting a resin solution containing a transparent resin from a casting die onto a running support to form a cast membrane; and
   a releasing step of releasing the cast membrane from the support,
   wherein, in the casting step, the resin solution is discharged from a discharge port of the casting die to cast the resin solution onto the support while a solvent capable of dissolving the transparent resin is flowed on an outer surface of the casting die from the positions above longitudinally opposite ends of the discharge port of the casting die toward the longitudinally opposite ends of the discharge port of the casting die, so that the solvent falls from the longitudinally opposite ends of the discharge port of the casting die, and
   the casting die has a surface energy of a first region which is 10 mN/m to 30 mN/m higher than a surface energy of a second region, the first region being the regions, on the outer surface of the casting die, surrounded by the positions above the longitudinally opposite ends of the discharge port of the casting die and the longitudinally opposite ends of the discharge port of the casting die, and the second region being a region on the outer surface of the casting die which is closer to a longitudinally central portion of the discharge port of the casting die than the first region.

2. The method for producing a resin film according to claim 1, wherein the first region has a surface roughness as ten-point height of irregularities Rz of 1,000 nm to 8,000 nm.

3. The method for producing a resin film according to claim 1, wherein each of the regions of the first region has a length in a direction parallel to the longitudinal direction of the discharge port of 1 mm to 10 mm.

4. The method for producing a resin film according to claim 1, wherein each of the regions of the first region has a length in a direction parallel to the longitudinal direction of the discharge port of 3 mm to 10 mm.

5. The method for producing a resin film according to claim 1, wherein the transparent resin is a cellulose ester resin, and the solvent contains methylene chloride.

* * * * *